US006943752B2

(12) United States Patent
Masumoto et al.

(10) Patent No.: US 6,943,752 B2
(45) Date of Patent: Sep. 13, 2005

(54) PRESENTATION SYSTEM, A DISPLAY DEVICE, AND A PROGRAM

(75) Inventors: Junji Masumoto, Ibaraki (JP); Shigekazu Yamagishi, Takatsuki (JP); Hiroshi Miyai, Takarazuka (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 667 days.

(21) Appl. No.: 09/965,049

(22) Filed: Sep. 27, 2001

(65) Prior Publication Data

US 2002/0036652 A1 Mar. 28, 2002

(30) Foreign Application Priority Data

Sep. 28, 2000 (JP) ....................................... 2000-297012

(51) Int. Cl.[7] .................................................. G09G 5/00

(52) U.S. Cl. ......................... 345/1.1; 715/730; 715/732

(58) Field of Search ........................... 345/1.1, 1.2, 2.1, 345/2.2, 7, 730, 732, 731, 734; 715/730, 732, 731, 734

(56) References Cited

U.S. PATENT DOCUMENTS 4,731,743 A * 3/1988 Blancato ..................... 345/632
5,917,480 A * 6/1999 Tafoya et al. ............... 345/732

FOREIGN PATENT DOCUMENTS

| | | |
|---|---|---|
| JP | 6-301498 | 10/1994 |
| JP | 7-007664 | 1/1995 |

* cited by examiner

*Primary Examiner*—Dennis-Doon Chow

(57) ABSTRACT

The present invention provides a presentation system, a display device, and a program which realize a smoother presentation performance in case where information a presenter wishes to refer to is displayed in a terminal but not in a display device. The presentation system of the present invention is structured, for instance, by connecting a PC 100 and a projector 200 via a LAN 50. A display unit of the PC 100 can be set up to display information including, for example, explanatory notes, but when making the projector 200 display an image, the information will not be displayed by executing a data modification which makes the information invisible. The information such as the explanatory notes may be placed at an arbitrary location on the display unit 102 and this enables a smoother presentation performance.

21 Claims, 23 Drawing Sheets

PRIOR ART

Fig..22

PRESENTATION SYSTEM, A DISPLAY DEVICE, AND A PROGRAM

This application is based on Japanese Patent Application No. 2000-297012, the content of which is hereby incorporated by reference.

BACKGROUND OF THE INVENTION (1) Field of the Invention

The present invention relates to a presentation system, a display device, and a program.

(2) Description of Related Art

Recently, a number of presentation systems for performing presentations in conference rooms and the like are being developed. As an example of such presentation systems, a usage of a combination of a terminal such as a personal computer (PC) with a display device such as a projector connected via a network is coming into practical use. The followings explain conventional presentation systems.

FIG. 1 is a diagram for explaining an example of the conventional presentation systems. The presentation system shown by the figure is made up of a PC 910 and a projector 920 connected via a local area network (LAN) 950 and displays an image projected by the projector 920 onto a screen 990.

FIG. 2 is a functional block diagram for showing a structure of the PC 910 and the projector 920 used in the above presentation system. The PC 910 is comprised of a communication unit 911, a display unit 912, and a file creation unit 913. The communication unit 911 executes tasks such as communication control between the PC 910 and the projector 920 via the LAN 950. To be more specific, a network interface corresponds to the communication unit 911. It performs process control such as transmission of a file which contains data indicating an image to be projected by the projector 920, and a reception of the image data transmitted from the projector 920, while transmitting the received image data to the display unit 912. As for the display unit 912, general display devices such as a cathode ray tube (CRT) or a liquid crystal display (LCD) may be used.

The file creation unit 913 creates and edits data which indicates an image to be projected by the projector 920. The PC 910 has application software which is generally called presentation software already installed and functions of the file creation unit 913 are realized by the software. Therefore, the file creation unit 913 may create and edit the data which indicates an image to be projected (to be referred as "slide data" hereinafter) onto the screen 990 at the time of a presentation performance. The slide data, for instance, is not image data itself which is expanded into a bitmap format. It is mainly made up from text displayed in the image, control text indicating the image, and the like. As for the control text, for instance, parameters which indicate a background color of the image, standard graphics and the like, a font and a color of the text which expresses the text part of the displayed image, and others may be included. Incidentally, compressed image data and others may be appended according to the need. By transferring the file including the slide data (to be referred as "presentation file" hereinafter), the load in transmission of the data on the network is reduced in comparison with a case where image data is transferred. Moreover, some contents of the slide data may realize functions such as moving one or more parts of the image data projected by the projector 920, by a control operation from the PC 910 (animation functions).

The projector 920 is comprised of a communication unit 921, a display unit 922, a file analysis unit 923, and an image expansion unit 924. The communication unit 921 executes communication control between the PC 910 and the projector 920 via the LAN 950. As for the display unit 922, image projecting mechanisms of general projectors including a LCD light valve and optics may be equipped.

The file analysis unit 923 analyzes the contents of the slide data transmitted by the PC 910. The image expansion unit 924 expands the slide data into image data to be actually projected onto the screen 990, based on the contents analysis, and makes the display unit 922 project the data. Incidentally, functions of the file analysis unit 923 and the image expansion unit 924 are realized by application software which is generally called a file viewer.

FIG. 3 is a flow chart showing the process of the PC 910 and the projector 920. First, a file including the slide data is created, by using the function of the file creation unit 913 of the PC 910 (S901). Then the PC 910 transmits the created file via the communication unit 911 (S902).

The communication unit 921 of the projector 920 receives the transmitted file (S903), and the file analysis unit 923 executes an analysis of the contents of the file, namely, the slide data (S904). The image expansion unit 924 expands the slide data into image data according to the analysis result (S905), and makes the display unit 922 display the image (S906).

On the other hand, the image expansion unit 924 transmits the expanded image data to the PC 910 via the communication unit 921 (S907). The PC 910 receives the image data (S908), then displays the image to the display unit 912 (S909). This allows an identical image of the image which is projected to the screen 990 to appear on the display unit 912 of the PC 910.

However, the above conventional presentation system has been providing a poor usability to a person who actually performs a presentation (to be referred as a "presenter" hereinafter). For example, there is a time when the presenter would like to refer to explanatory notes for reading out to his audience. However, a presentation venue tends to be dark with no lights on and it is therefore difficult to refer to the prepared notes during the presentation performance, thus interfering with a smooth presentation performance.

To deal with these problems, following presentation software is in practical use. FIG. 4 is a diagram for explaining the function of conventional presentation software. As shown in the figure, conventional presentation software provides an area 9122 (to be referred as a notes area hereinafter) for displaying explanatory notes and the like in the display unit 912 of the PC 910, in addition to an area 9121 (to be referred as a slide area hereinafter) which displays an image of the slide to be displayed by the projector 930 which is connected to the PC 910 via a cable 960 (to be referred as a slide hereinafter). The presenter may perform a presentation while referring to the explanatory notes displayed in the notes area 9122.

However, there are times when the above conventional presentation software still shows a poor usability. The slide area 9121 and the notes area 9122 are two different areas and if the notes area 9122 is moved to the top of the slide area 9121, the slide may be partially hidden beneath the notes area 9122, thus the presenter may not refer to both areas as required while performing a presentation.

For instance, when a Japanese presenter performs an English presentation for foreign audience, the presenter may wish to refer to a translated notes in Japanese while displaying English slides in the slide area 9121. When long English sentences are used or the sentences are dispersed all over the slides, it is difficult to give a presentation while judging which Japanese sentence corresponds to a particular English sentence at the same time, even with the translated text in the notes area 9122, and as a result, a smooth flow of the presentation is interfered.

Moreover, when a graph such as a line graph is displayed in the slide, the presenter may wish to refer to the explanatory notes prepared individually for each part of the graph. Again, it is difficult to give a presentation while judging the corresponding relationship between the graph and the explanatory notes displayed in the notes area 9122.

SUMMARY OF THE INVENTION

The objective of the present invention is to provide a presentation system, a display device, and a program in order to realize a smoother presentation.

The above objective is achieved by the presentation system which is characterized by having (a) a display device including a data obtaining unit for obtaining a file containing slide data which indicates a first slide image, a data modifying unit for modifying the slide data to make one or more parts of the first slide image invisible, a first display unit, and a first display image setting unit for having the first display unit display a second slide image based on the modified slide data, the second slide image being a slide image in which one or more parts of the first slide image are invisible, and (b) a terminal including a second display unit and a second display image setting unit for having the second display unit display the first slide image.

According to this structure, the terminal side displays a first slide while the display device side (a) modifies the slide data so as to make one or more parts of the subject shown on the first image invisible, and (b) displays a second image in the first display unit, based on the modified slide data. Therefore, it is unnecessary to provide a separate area such as a notes area, and since this presentation system makes one or more parts of the subject shown on the slide used for the presentation invisible, it is possible to write the explanatory notes, which should be invisible at the time of display by the display device side, in an arbitrary location of the slide. Moreover, because the slide is not covered as in the case where a notes area is used, a smooth presentation can be realized.

Incidentally, the invisible part can be realized by using a textbox to be embedded in the slide. In this case, by having the textbox embedded in the slide and making the contents of the textbox invisible, the subject to be displayed and the textbox to be invisible in the modified slide can be placed so as to overlap each other partially, in the original slide.

By providing the data modifying unit in the display device, the need for installing new software on the terminal side for modifying the slide data is eliminated.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings.

DESCRIPTION OF PREFERRED EMBODIMENT

The followings explain embodiments of a presentation system and the like related to the present invention, by referring to figures.

(First Embodiment)

(1) An overall structure of a presentation system

Figure 1:
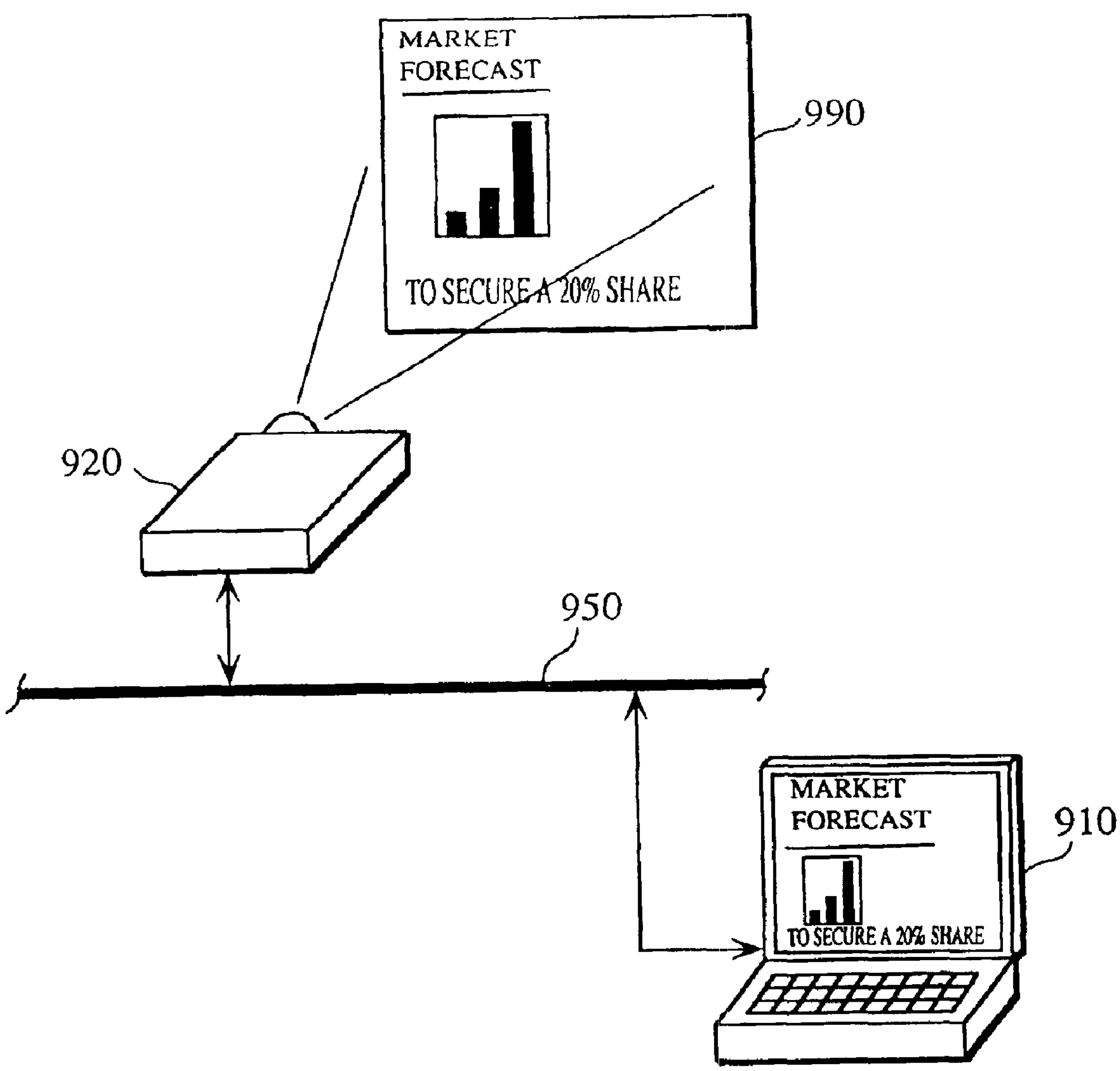
FIG. 1 is a diagram explaining an example of a conventional presentation system.
Figure 2:
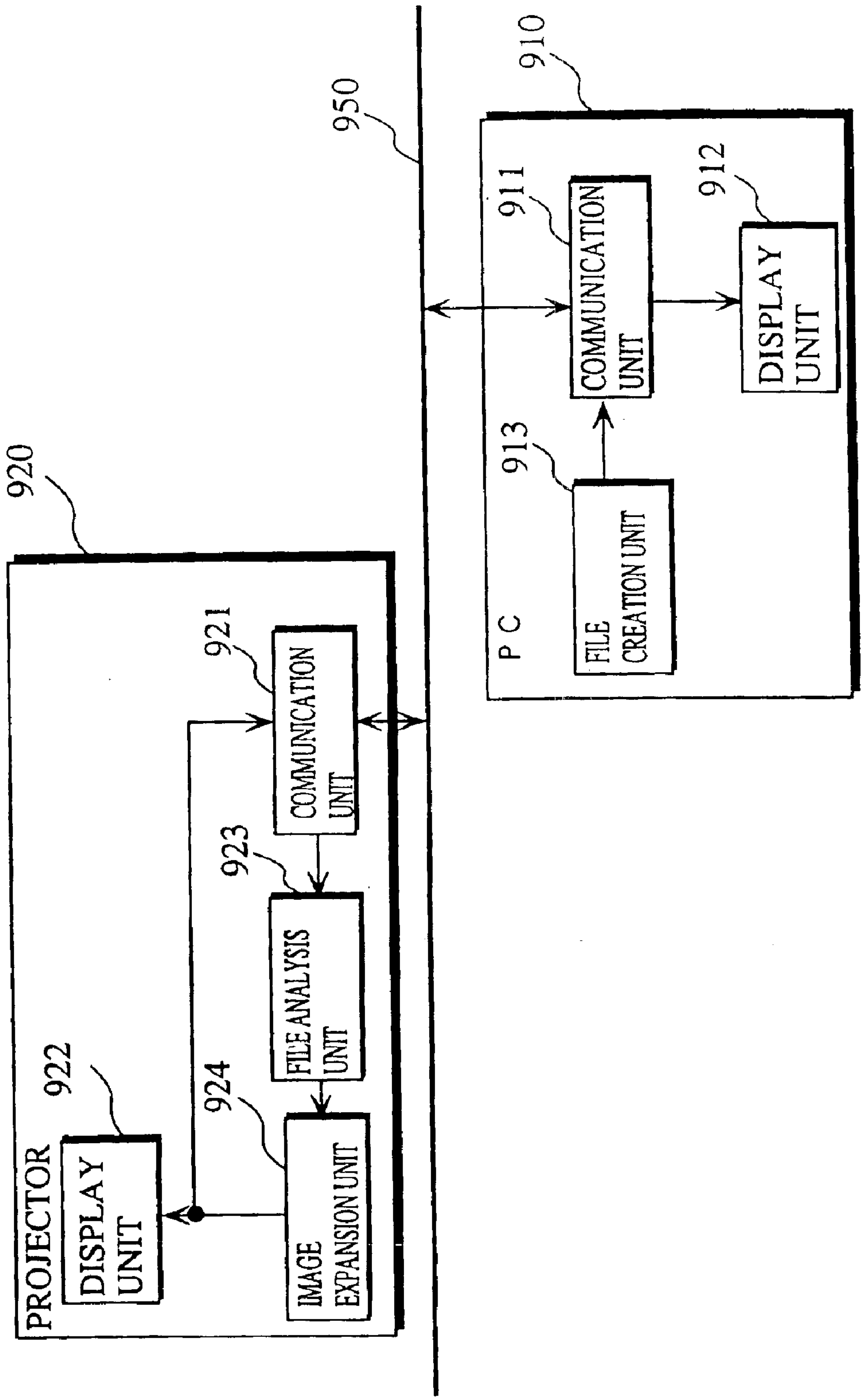
FIG. 2 is a functional block diagram showing a structure of a PC 910 and a projector 920 in a conventional presentation system.
Figure 3:
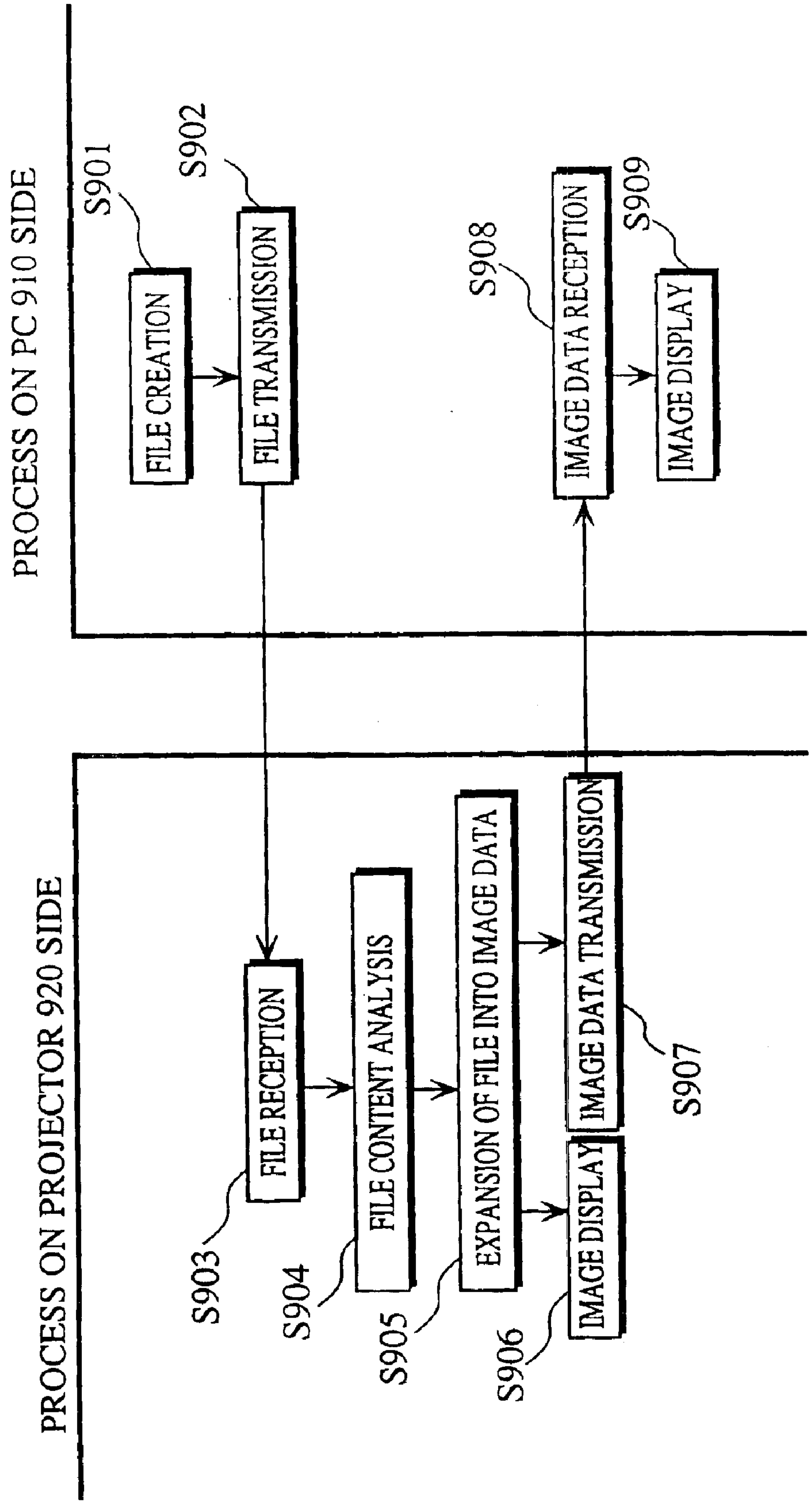
FIG. 3 is a flow chart showing processes executed by a PC 910 and a projector 920 in a conventional presentation system.
Figure 4:
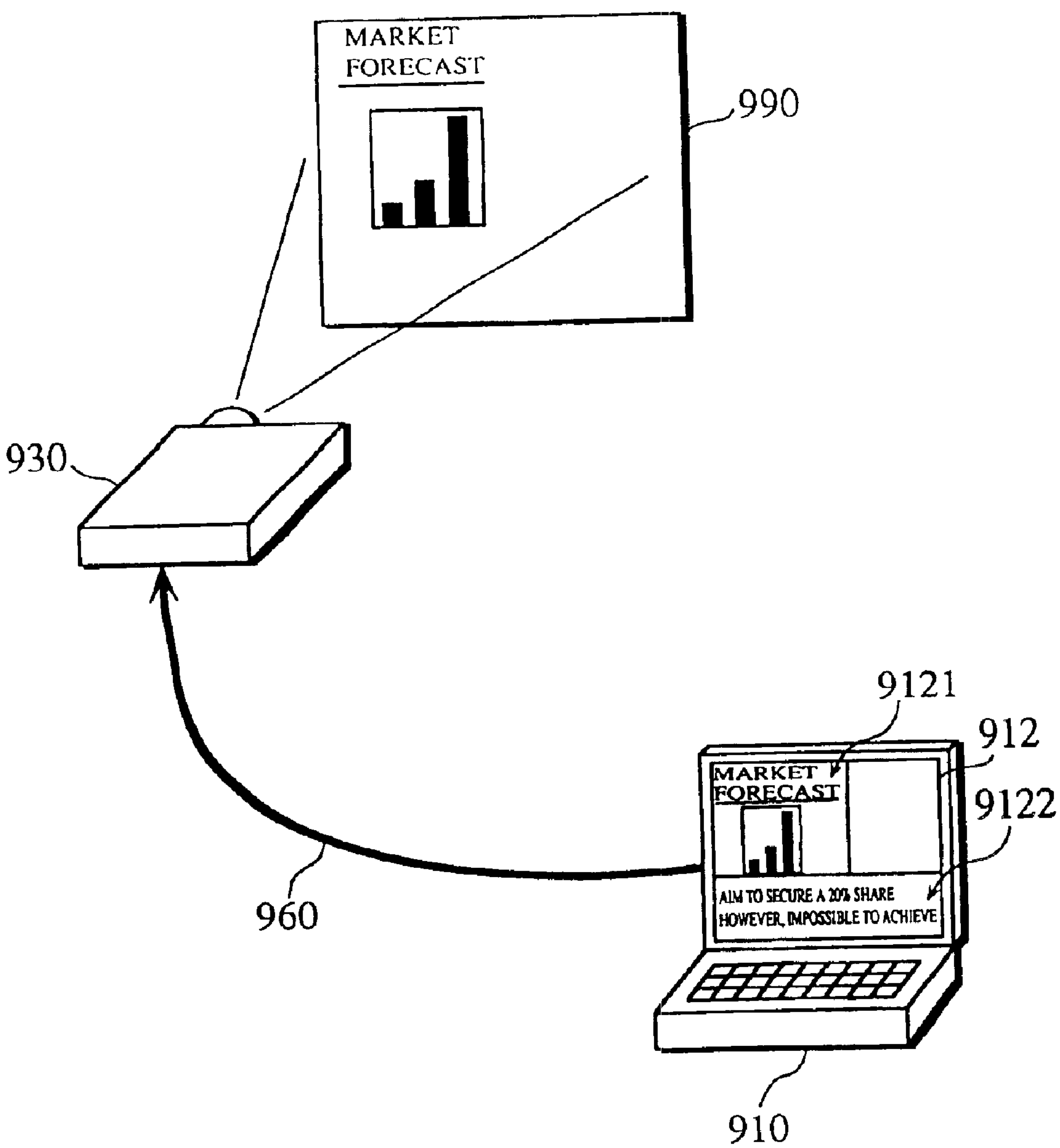
FIG. 4 is a diagram explaining functions of conventional presentation software.
Figure 5:
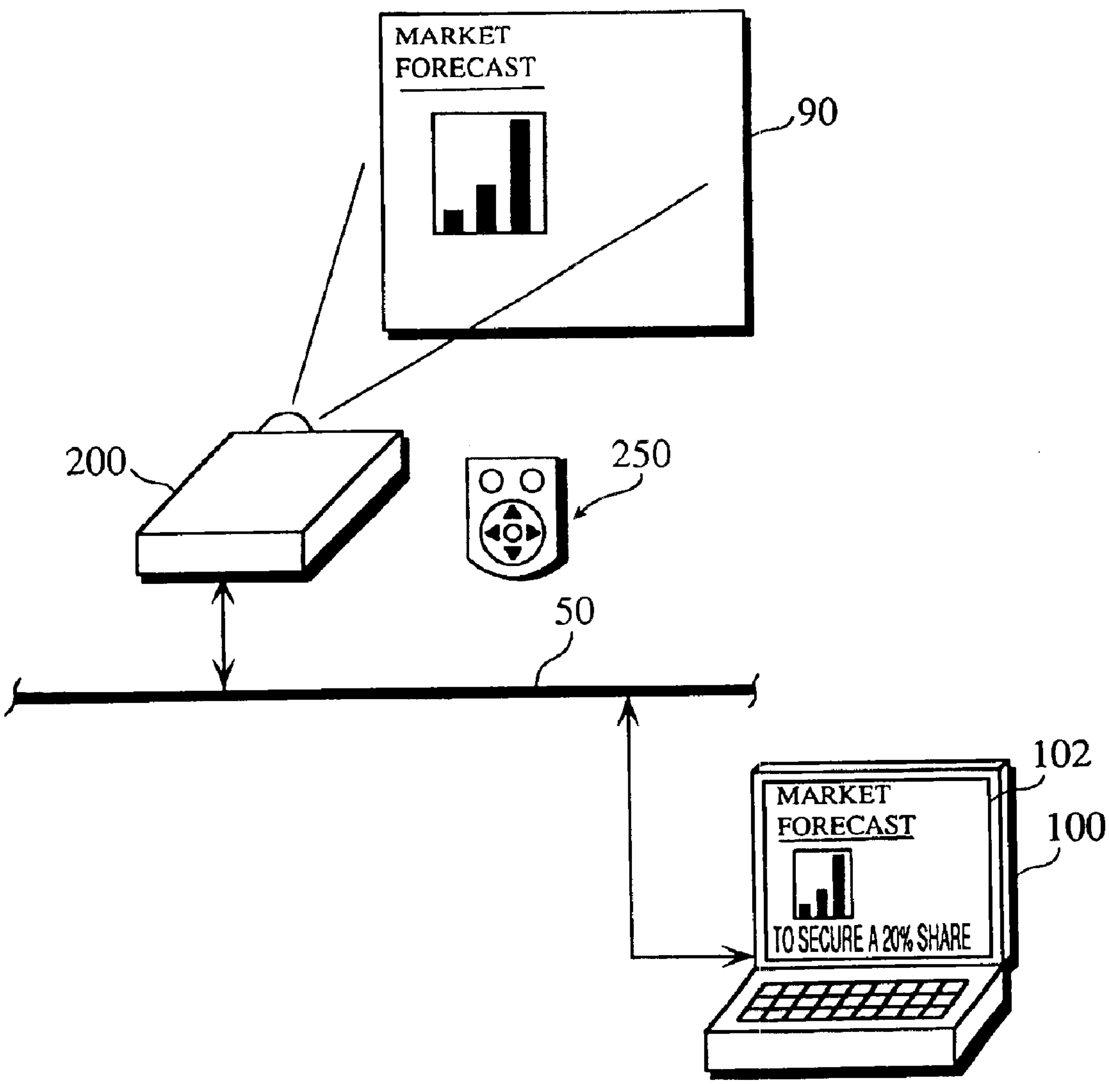
FIG. 5 is a diagram explaining an overall structure of a presentation system related to the present invention.
Figure 6:
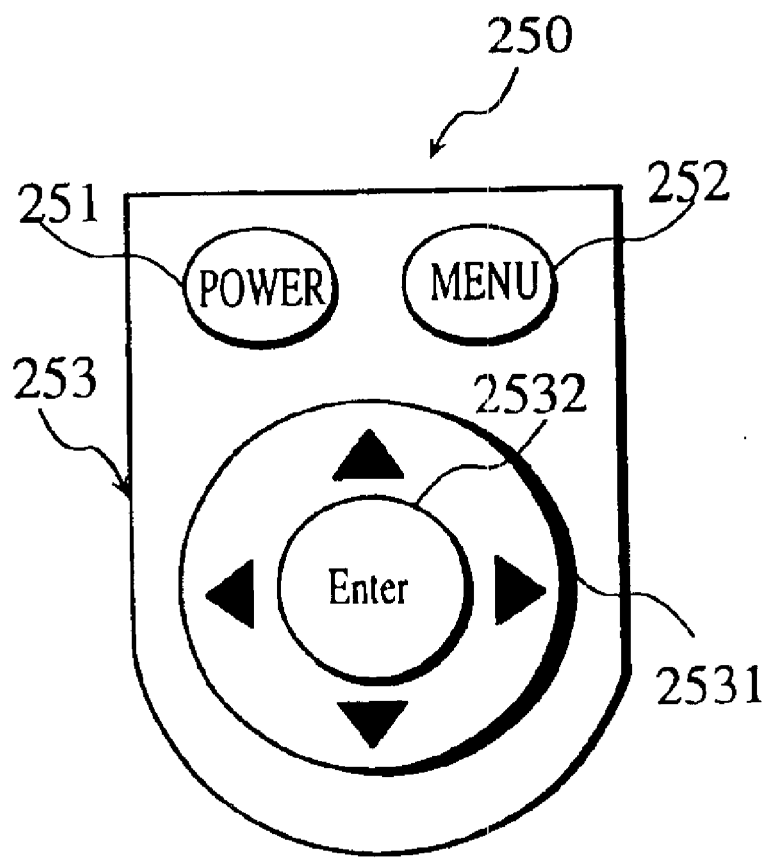
FIG. 6 is a diagram showing an example of a remote controller 250.

FIG. 5 is a diagram explaining the overall structure of a presentation system related to the present invention. As the figure shows, the presentation system, like the one shown by FIG. 1, is structured by having a PC 100 and a projector 200 connected by a LAN 50, and an image projected by a projector 200 is displayed on a screen 90. Incidentally, a user may operate the projector 200 by using a remote controller 250. To be more specific, the user may select a file to be displayed, set up various initial settings, and set whether to use the presentation effects related to the present invention. FIG. 6 is a diagram showing an example of the remote controller 250. The remote controller 250 is comprised of a power key 251, a menu key 252, and an operation key 253, and the operation key 253 includes an arrow key 2531 and an enter key 2532. A detailed operation procedure using the remote controller 250 will follow later.

According to the presentation system of the present embodiment, an image displayed by the display unit 102 of the PC 100 displays text, "TO SECURE A 20% SHARE", but an image projected by the projector 200 does not display the text. In the present invention, the text, "TO SECURE A 20% SHARE", displayed by the display unit 102 is invisible when projected by the projector 200. Hereinafter, data in the slide data which corresponds to invisible parts like this is referred as "designated data". The followings explain a method to realize displays like the above in detail.

(2) The structure of the PC 100 and the projector 200

Figure 7:
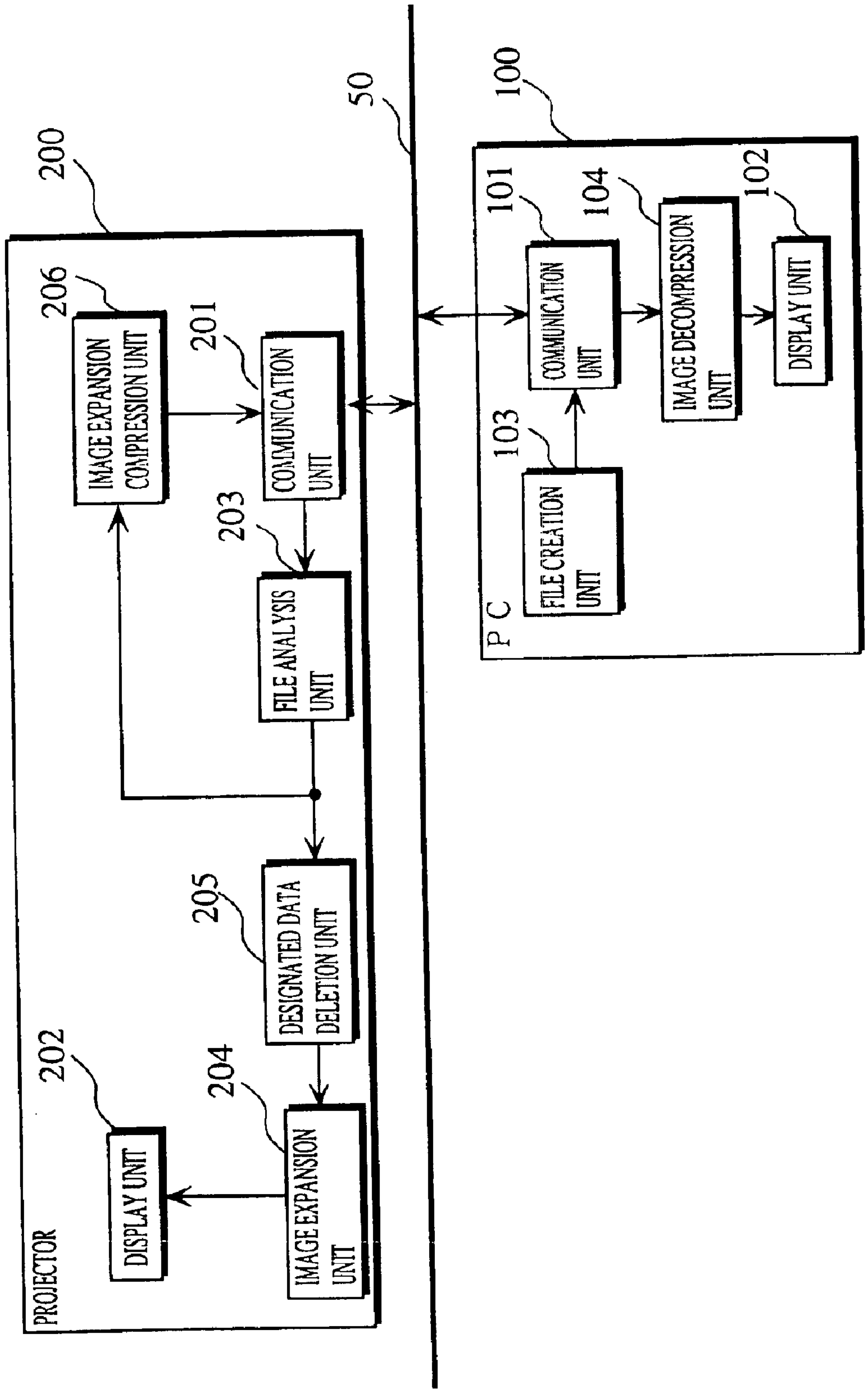
FIG. 7 is a functional block diagram showing a structure of a PC 100 of a first embodiment and a projector 200.

FIG. 7 is a functional block diagram showing the structure of the PC 100 and the projector 200 of the present embodiment. As shown by the figure, the PC 100 is comprised of a communication unit 101, a display unit 102, a file creation unit 103, and an image decompression unit 104. Explanations of the communication unit 101, the display unit 102, and the file creation unit 103 are omitted as they are exactly the same as their equivalents explained in the related art section.

The projector 200 of the present embodiment transmits the image data to be displayed by the display unit 102 of the PC 100 to the PC 100, by compressing the data using a JPEG format and the like. The image decompression unit 104 decompresses the compressed image data which is transmitted by the projector 200 and sends it to the display unit 102.

On the other hand, the projector 200 is comprised of a communication unit 201, a display unit 202, a file analysis unit 203, an image expansion unit 204, a designated data deletion unit 205, and an image expansion compression unit 206. Explanations of the communication unit 201, the display unit 202, the file analysis unit 203, and the image expansion unit 204 are omitted as they are exactly the same as their equivalents explained in the related art section. Incidentally, the projector 200 of the present embodiment is equipped with a device-embedded type operation system (OS) such as a Windows CE (Microsoft™) onboard, and the projector 200 may utilize file functions of the OS, execute various application software upon the OS, and so on. Therefore, any of image expansion processes carried out by the file analysis unit 203, the image expansion unit 204 and the image expansion compression unit 206 can be realized by using functions of so-called viewer software which operates upon the OS; also other functions can be realized by operating the program upon the OS. Of course, for executing an image compression process by way of the image expansion compression unit 206, an exclusive hardware may be used.

The designated data deletion unit 205 deletes parts corresponding to the designated data from the slide data analyzed by the file analysis unit 203. According to the present embodiment, for instance, by using the remote controller 250 and the like, it is possible to set whether to execute deletion of the designated data (making the data invisible) or not, but conditions for deletion are to be fixed. As for the conditions for deletion, for instance, may be designated so that text employing a particular font or a color, or image data compressed by using a particular format. The followings explain the process of the designated data deletion in detail.

Figure 8:
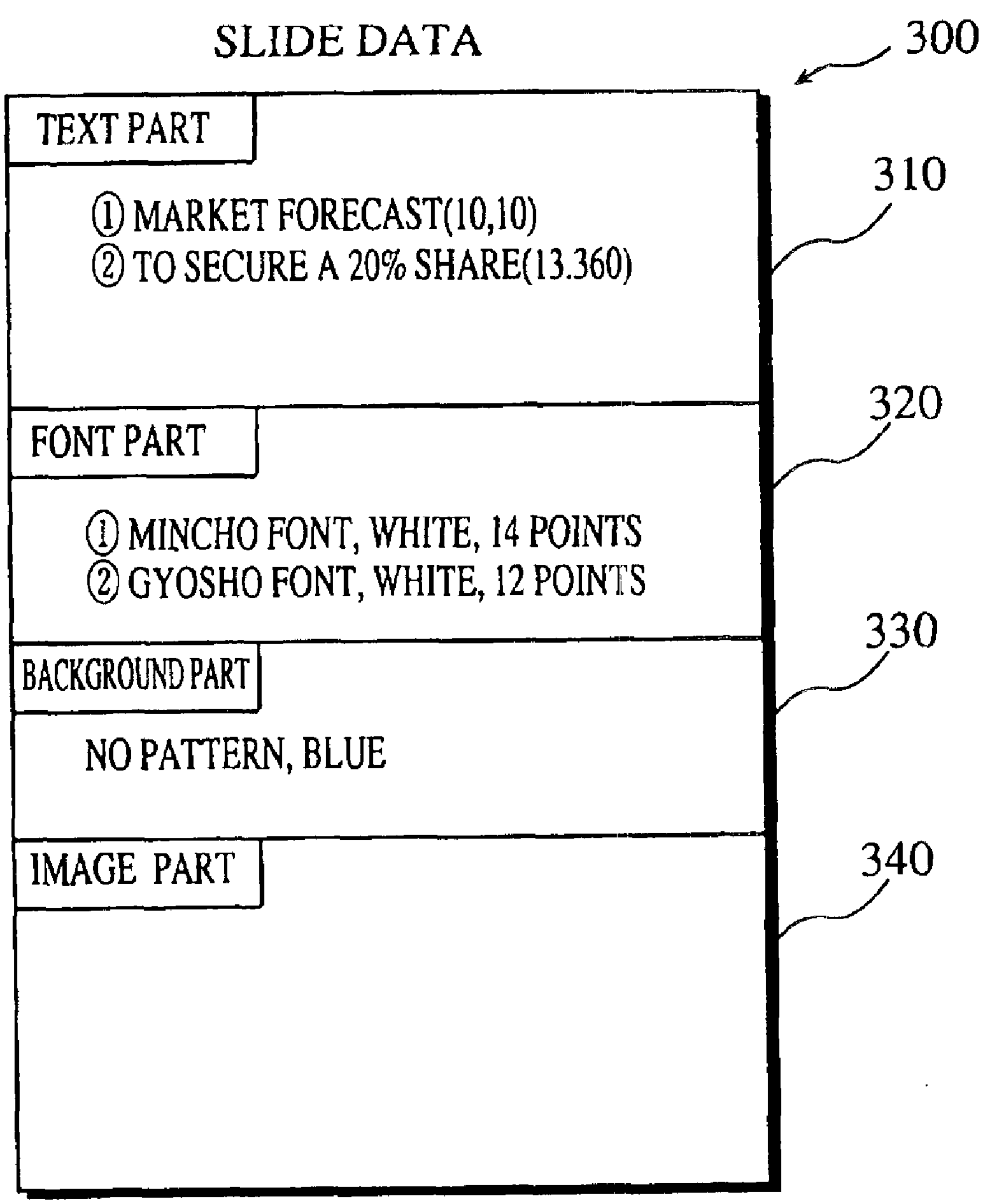
FIG. 8 is a diagram showing contents examples of slide data of a first embodiment.

FIG. 8 is a diagram showing an example of contents of the slide data in the present embodiment. As shown by the figure, slide data 300 is comprised of a text part 310, a font part 320, a background part 330, and an image part 340. The text part 310 stores text related data included in the slide data. Following explanations use a screen displayed by the display unit 102 of the PC 100 shown in FIG. 5 as an example. The text part 310 stores text data such as "MARKET FORECAST", "TO SECURE A 20% SHARE", and information indicating a display location of the text in relation to the screen. The information indicating the display location is included here as the text is generally created by using a function called a textbox and so on, which may be placed at an arbitrary location of the display screen. However, together with a font setting procedure and the like explained next, the above may be executed by using functions of the presentation software without using the textbox function, or by partially using textbox functions and the like.

The font part 320 stores information related to a text font, in correspondence with the textbox containing text stored in the text part 310. In an example shown in FIG. 8, it has been predetermined for the text, "MARKET FORECAST", to employ a Mincho font, a white color, and 14 points whereas for the text, "TO SECURE A 20% SHARE", to employ a Gyosho font, a white color, and 12 points.

The background part 330 stores information related to a background. In an example shown in FIG. 8, it has been predetermined for the background to employ no pattern but a blue color. Incidentally, in case of actual slide data, information to be stored in the font part 320, the background part 330 and the like may be parameters which indicate the font and the color of the text, and the background color and the like by the use of a small number of characters. This reduces the amount of data to be transmitted via the network 50.

In the image part 340, data such as image data compressed is stored as required. The image part 340 can be set to store information for using animation functions, or parameters for indicating graphs and standard figures. Nevertheless, when the image to be displayed is made up of text alone, the image part 340 need not to store anything Incidentally, the designated data deletion unit 205 of the present embodiment refers to the above slide data and deletes text data, for example, one employing a designated font. Thus, if text employing the Gyosho font is set to be invisible, the designated data deletion unit 205 deletes text data $\hat{2}$ which employs the Gyosho font from the text part 310, and also from the font part 320. By this, the image is expanded into image data at the image expansion unit 204 and the image displayed by the display unit 202 is deleted of the text data $\hat{2}$, thus the text data $\hat{2}$ made invisible.

On the other hand, the image expansion compression unit 206 expands the slide data before being deleted of the designated data by the designated data deletion unit 205 into image data and compresses the image data by using a compression format such as the JPEG. The compressed data is transmitted to the PC 100 via the communication unit 201. The image data to be transmitted to the PC 100 is compressed because (a) a slight deterioration in image quality is acceptable as the image displayed by the display unit 102 is to be referred only by the presenter, and (b) a faster data transmission can be achieved.

(3) Processing of the PC 100 and the projector 200

Figure 9:
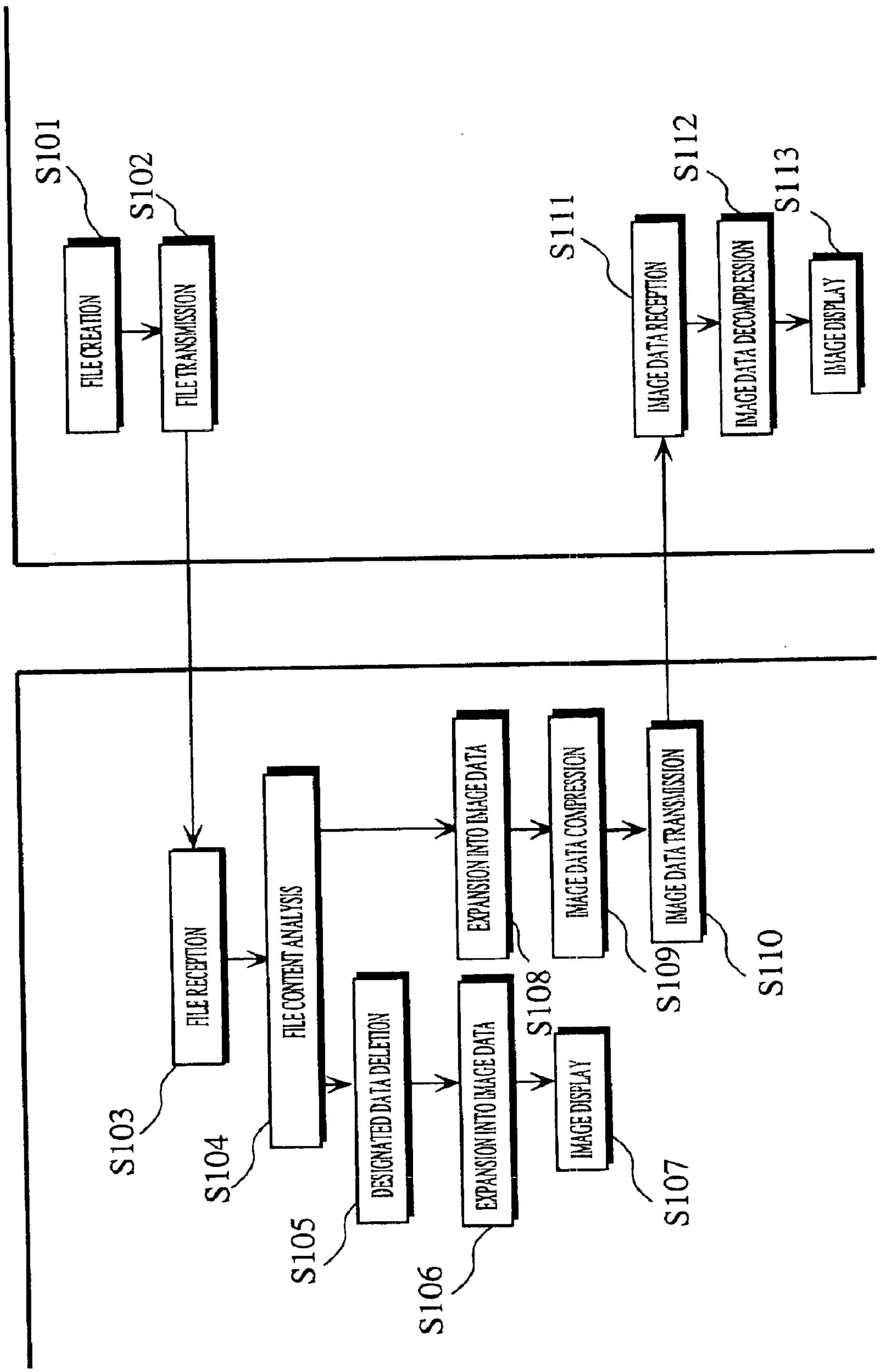
FIG. 9 is a flow chart showing processes executed by a PC 100 and a projector 200 of a first embodiment.

FIG. 9 is a flow chart showing processing of the PC 100 and the projector 200 of the present embodiment. First, a file including the slide data is created by the file creation unit 103 of the PC 100 (S101), then the created file is transmitted to the projector 200 side via the communication unit 101 (S102).

At the projector 200, the communication unit 201 receives the file (S103) and the file analysis unit 203 analyzes the contents of the file (S104).

At the projector 200 of this embodiment, the designated data deletion unit 205 deletes designated data after analyzing the file contents (S105). There are various ways to set determinants for judging whether data is designated data. Therefore, for instance, judging of data not only by text employing a particular font and image data compressed by a specific format as the abovementioned, but also by a specific color and a text size (point) may be executed. Also, multiple conditions can be set, for instance, it is possible to delete one or more text employing different fonts. Data may be deleted according to the conditions set not only when utilizing the textbox to place text but also when utilizing the functions of the presentation software to input text, as long as a searching and deletion of the designated data by the designated data deletion unit 205 can be carried out.

Figure 10:
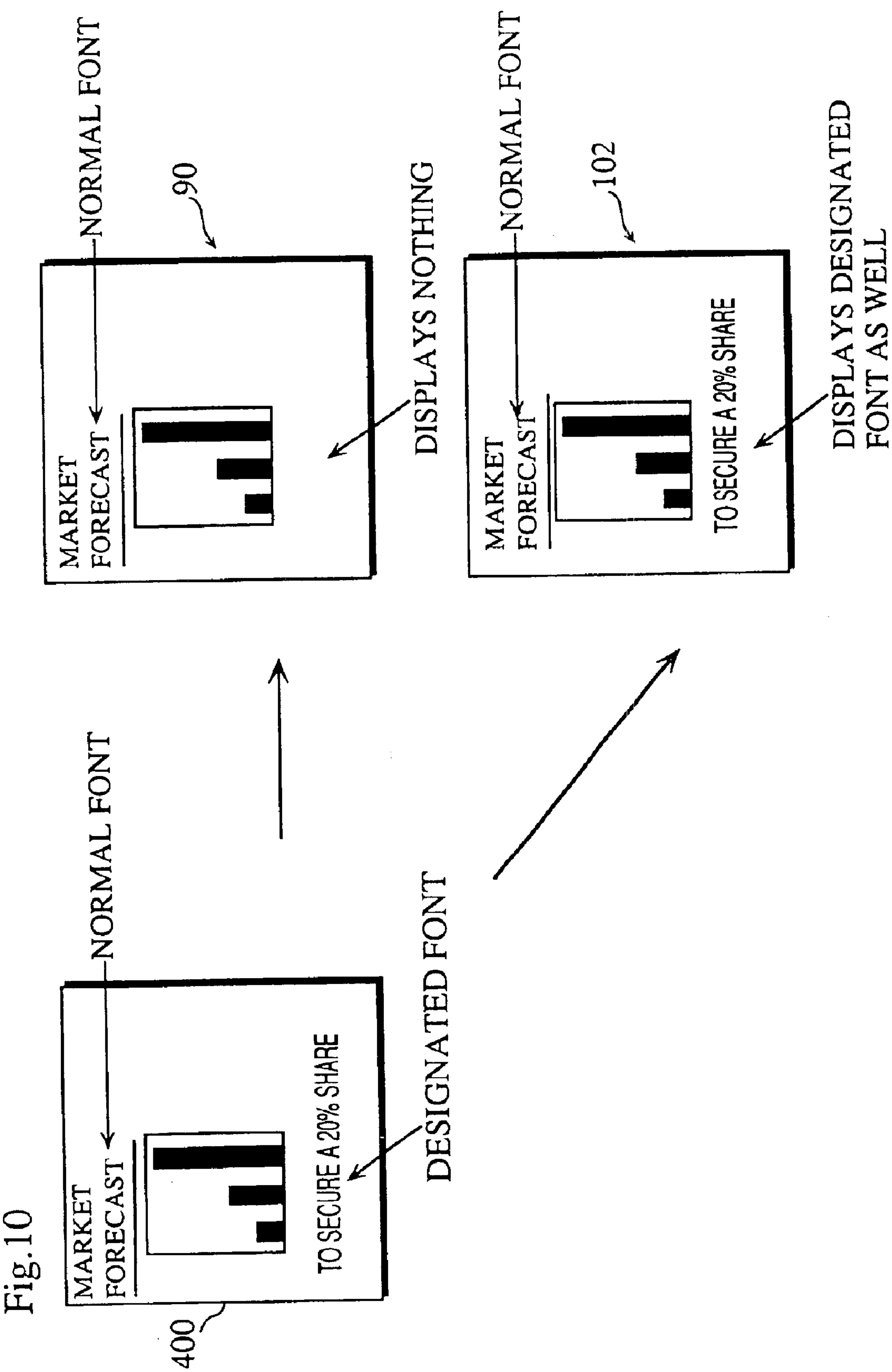
FIG. 10 is a diagram explaining how image 400 which corresponds to the slide data created by a file creation unit 103 is displayed by a screen 90 and a display unit 102 in a first embodiment.

The image expansion unit 204 expands the slide data which is being deleted of the designated data into image data (S106) and makes the display unit 202 display the data (S107). FIG. 10 is a diagram showing how the image 400 which corresponds to the slide data created by the file creation unit 103 is displayed by the screen 90 and the display unit 102. As shown in the top right of FIG. 10, an image of text which is employing a particular font and being invisible is projected to the screen 90.

On the other hand, the image expansion compression unit 206 expands the slide data before being deleted of the designated data into image data (S108), compresses the expanded image data by using the JPEG format (S109), and transmits the data to the PC 100 via the communication unit 201 (S110). The PC 100 receives the transmitted compressed image data (S111), decompresses the compressed image data at the image decompression unit 104 (S112), and displays the data to the display unit 102 (S113). This enables the presenter to give a presentation while referring to the information displayed by the display unit 102 as the designated data employing a particular font is shown by the display unit 102 of the PC 100 (refer to the diagram at the bottom right of FIG. 10).

As explained in the above, according to the presentation system of the present embodiment, the presenter may refer to information such as explanatory notes shown in the display unit 102 of the PC 100, thus a smoother presentation can be realized. Also, in case the textbox functions are utilized, the explanatory notes and the like maybe placed in an arbitrary location of the screen, therefore the information may be placed where the presenter finds it easy to look at.

(Second Embodiment)

Next, the second embodiment of the present invention is explained.

In the first embodiment, conditions for deletion (for instance, a particular font, to be referred as "deletion conditions" hereinafter) by the designated data deletion unit 205 were to be fixed, but for instance, when the deletion condition for deleting text employing the Gyosho font is fixed, it means that the Gyosho text cannot be displayed to the screen 90.

Considering cases that it may be preferable to display the Gyosho text to maximize effectiveness of the presentation, it may not be desirable to fix the deletion conditions. Therefore, the present embodiment explains a case which allows a deletion condition setting.

Figure 11:
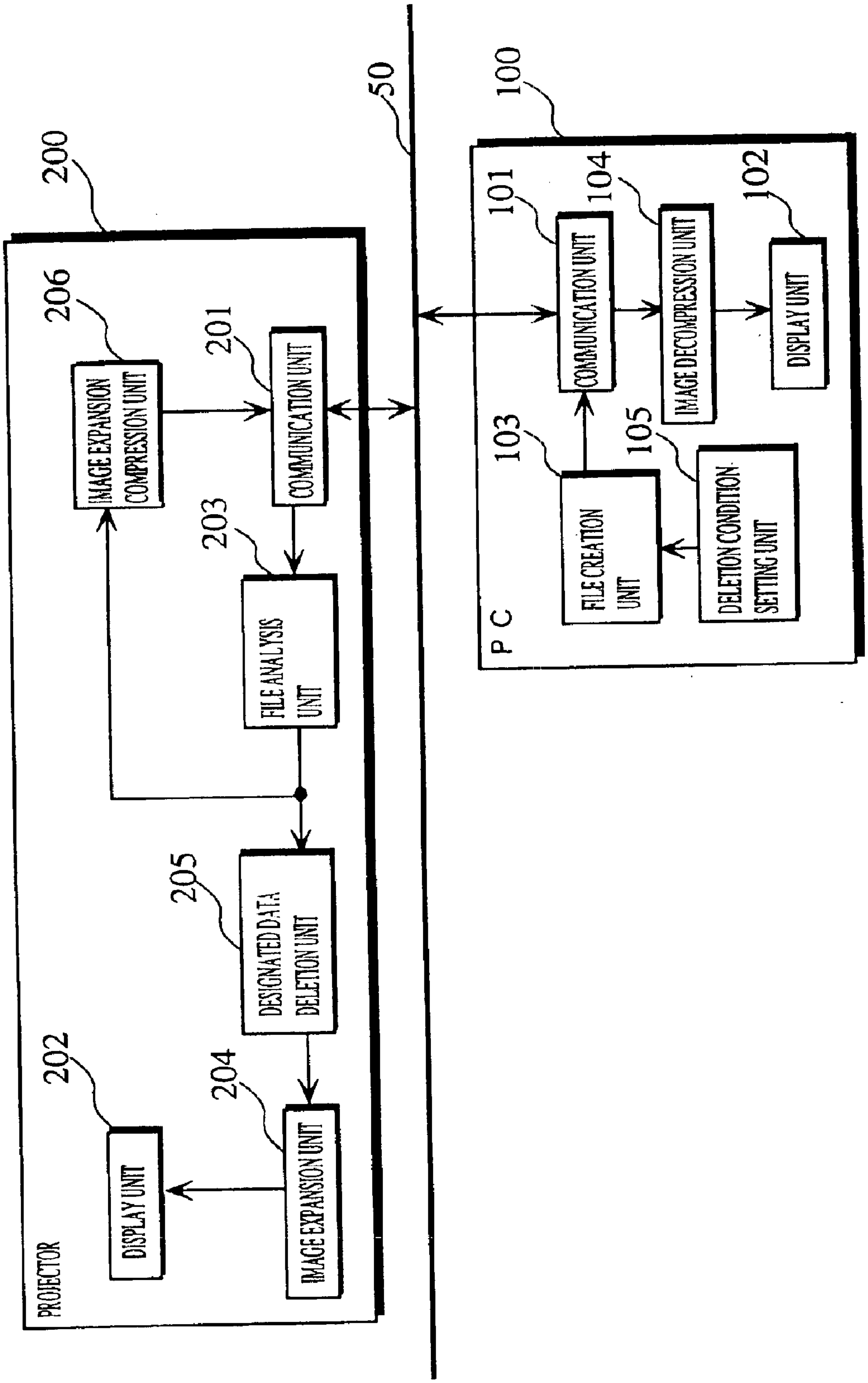
FIG. 11 is a functional block diagram showing a structure of a PC 100 and a projector 200 of a second embodiment.

FIG. 11 is a functional block diagram showing structure of the PC 100 and the projector 200 of the present embodiment. As shown by the figure, in the present embodiment, a deletion condition setting unit 105 is provided to the PC 100 side to enable a setting of the deletion conditions. As for a concrete designation method, a displaying of a window onto the display unit 102 for setting deletion conditions is available to designate the deletion condition using the window.

Figure 12:
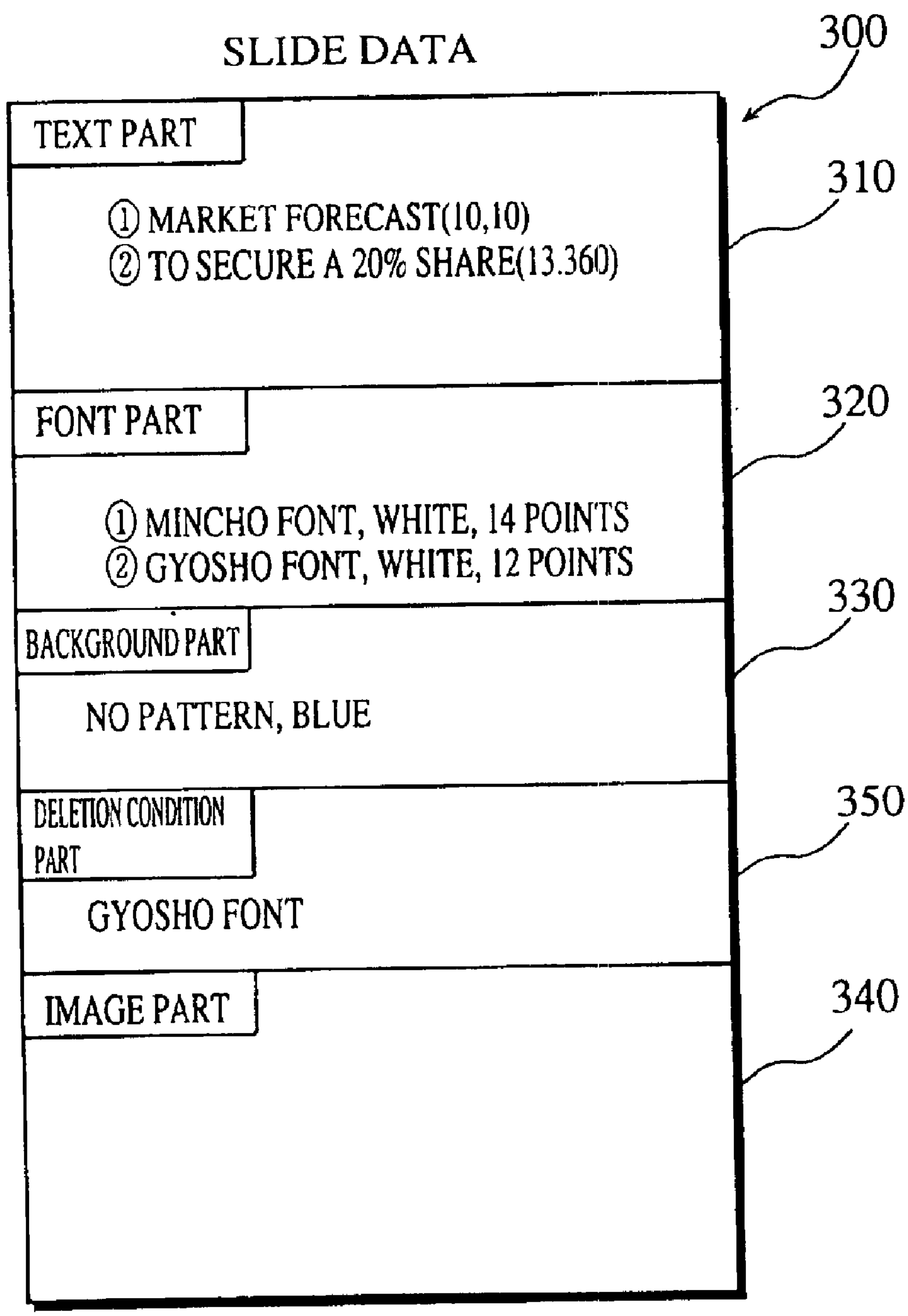
FIG. 12 is a diagram showing contents examples of the slide data of a second embodiment.

FIG. 12 is a diagram showing an example of contents of the slide data of the present embodiment. As shown by the figure, the slide data of the present embodiment includes a deletion condition part 350, and according to the example, deletion of the Gyosho text is specified. The file analysis unit 203 obtains the deletion conditions upon contents analysis of the slide data, and transmits the data to the designated data deletion unit 205. By having the designated data deletion unit 205 execute data deletion according to the deletion conditions, data which satisfies the deletion conditions is deleted and the remaining data is then projected to the screen 90.

Figure 13:
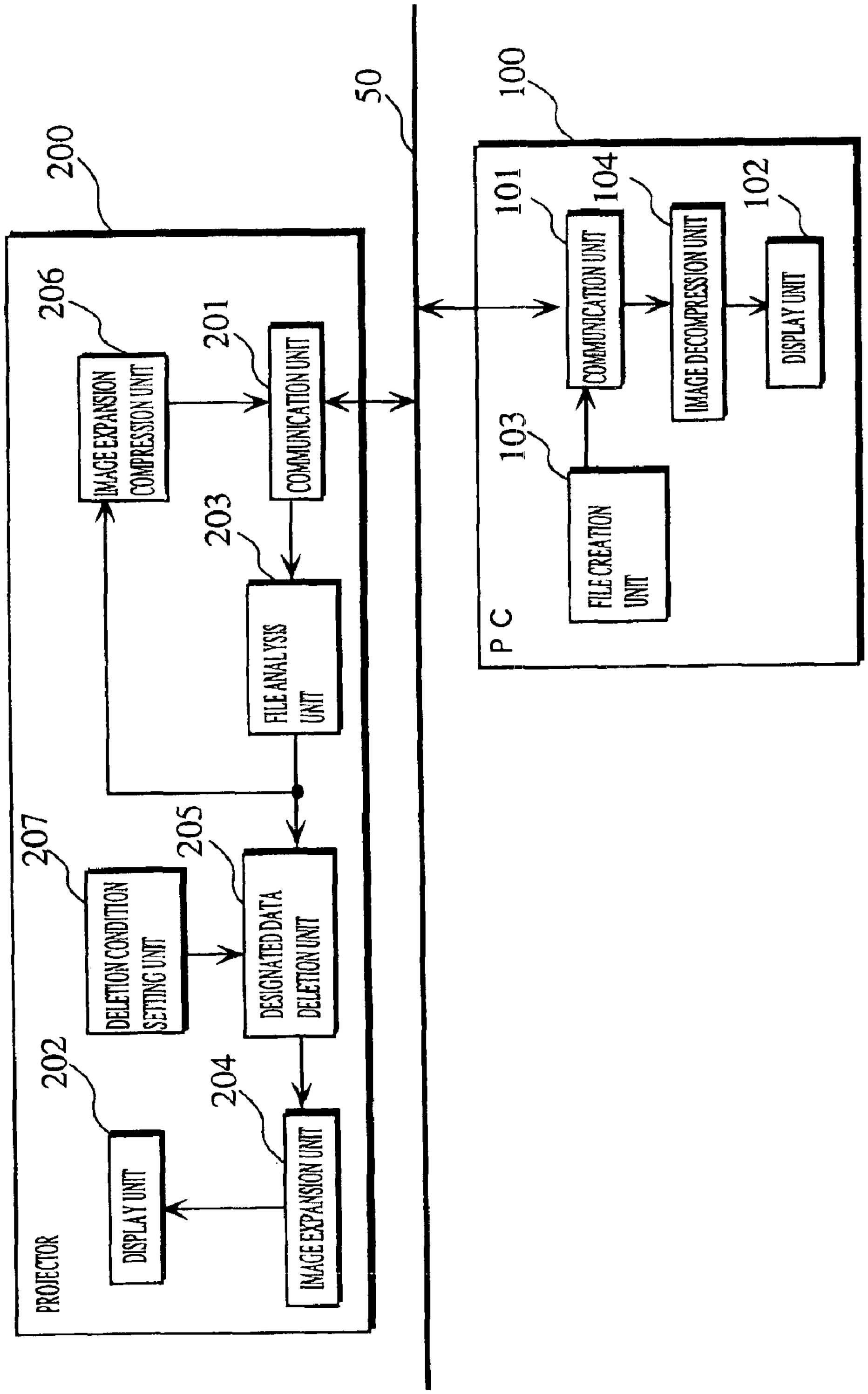
FIG. 13 is a functional block diagram showing another structure example of a PC 100 and a projector 200 of a second embodiment.

Incidentally, in the present embodiment, deletion conditions, are specified when the slide data is created by the PC 100, nevertheless, as shown in FIG. 13, deletion conditions may be set by providing a deletion condition setting unit 207 to the projector 200 side. This eliminates the need to include the deletion condition part 350 in the slide data 300. The deletion condition setting unit 207 can be realized by a switch or a button provided to a body of the projector 200, or the use of the remote controller 250. The followings explain in detail a method which provides the deletion condition setting unit 207 to the projector 200 side and utilizes the remote controller 250 for setting the conditions.

Figure 14A:
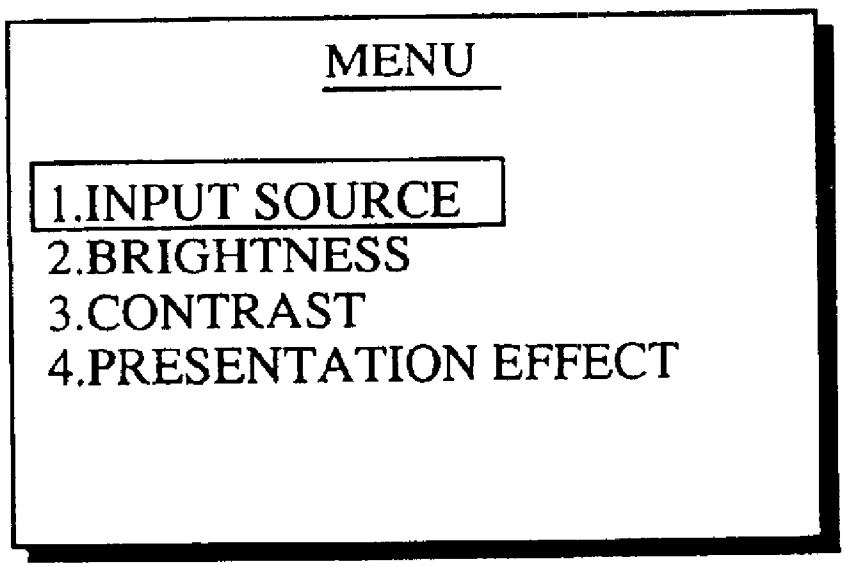
FIGS. 14A and 14B are diagrams showing examples of a menu screen.
Figure 14B:
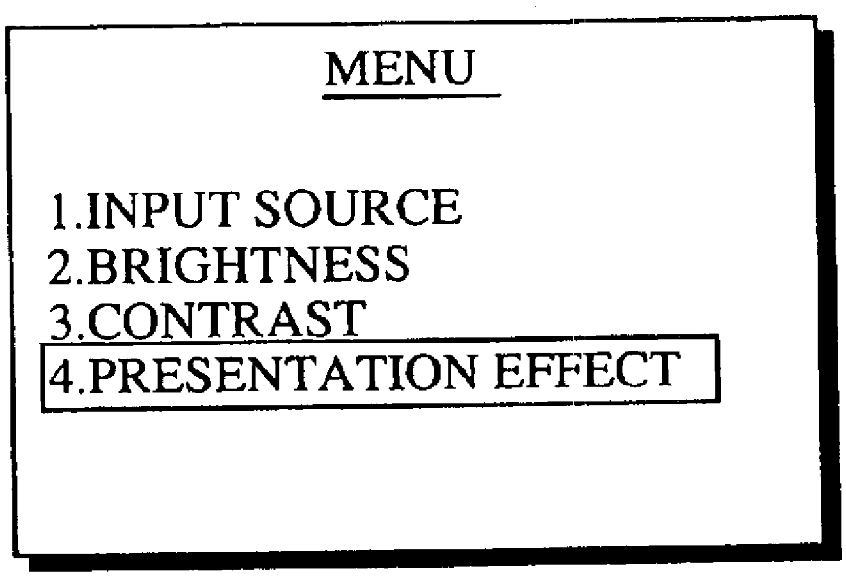

FIG. 14A and FIG. 14B are diagrams showing examples of screens shown by the projector 200 (to be referred as a "menu screen" hereinafter) when the menu key 252 is pressed. The first screen displayed when pressing the menu key 252 displays a cursor pointing at "1. Input source" as shown in FIG. 14A. By manipulating the arrow key 2531 and moving the cursor downward, the user may display the cursor pointing at "4. Presentation effects", as shown in FIG. 14B. By pressing the enter key 2532 while selecting "4. Presentation effects" like the above, the screen first proceeds to a deletion setting screen.

Figure 15A:
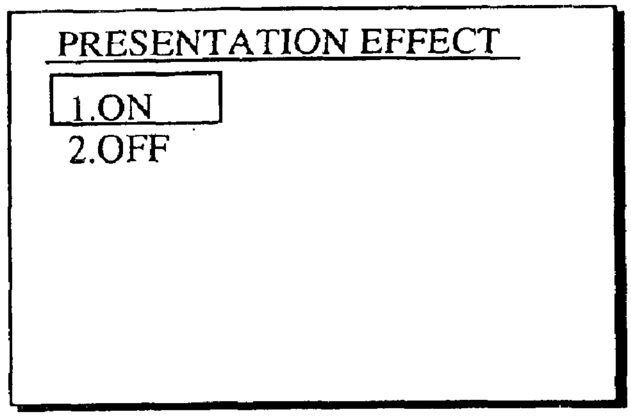
FIG. 15A is a diagram showing an example of a deletion setting screen.

FIG. 15A is a diagram showing an example of a deletion setting screen. The deletion setting screen executes a setting of whether to utilize functions of the presentation effects of the present invention. Regarding the cursor movements and the selection process by using the enter key 2532, they are the same as explained in the above. For instance, when methods and conditions for deletion are fixed as in the first embodiment, it is enough to specify whether to utilize the functions of the present invention in this deletion setting screen.

Figure 15B:
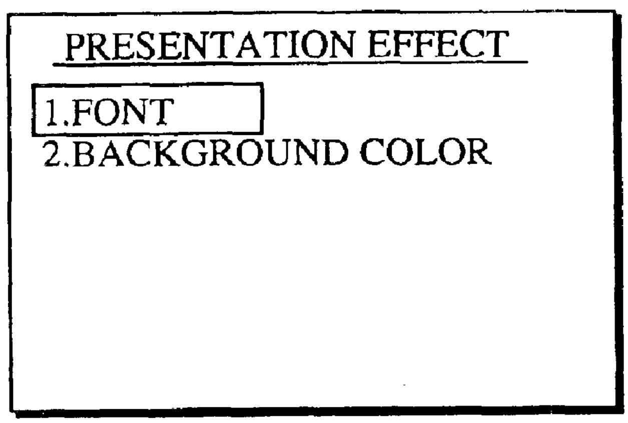
FIG. 15B is a diagram showing an example of a deletion method setting screen.
Figure 15C:
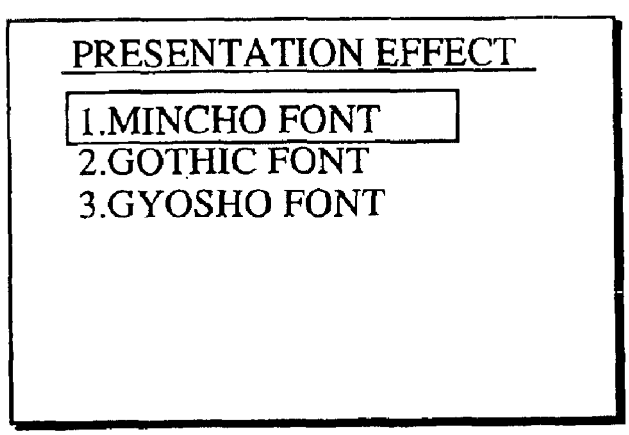
FIG. 15C is a diagram showing an example of a deletion condition setting screen.
Figure 16:
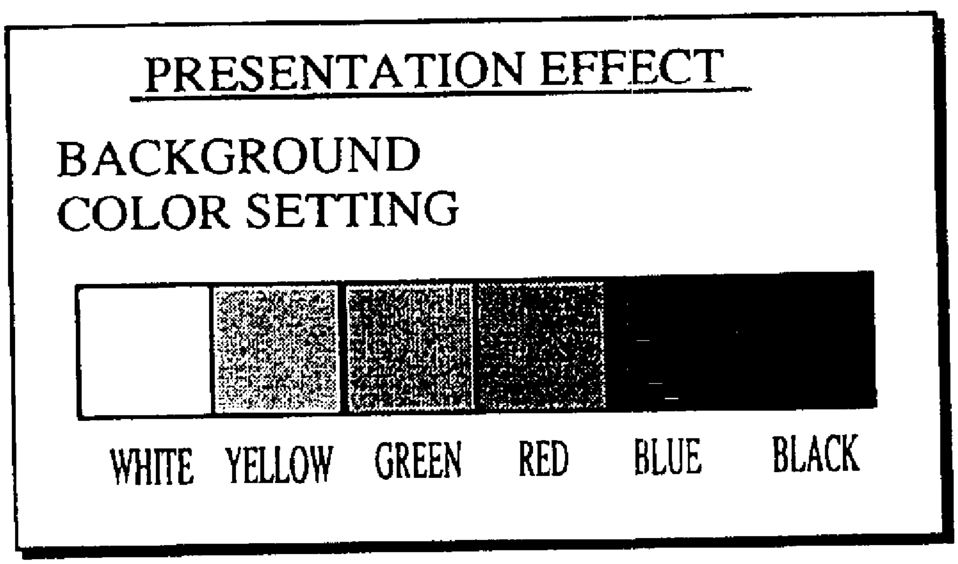
FIG. 16 is a diagram showing an example of a screen displayed when a background color is set.

Like the present embodiment, when providing a deletion condition setting unit 207 to enable the setting of methods and conditions for deletion, the screen proceeds to the deletion method setting screen shown in FIG. 15B for instance, when "1. On" is selected in the deletion setting screen. In the deletion method setting screen, the user specifies whether to delete text which employs a particular font or modify the background color as explained later, as a deletion method. Supposing that "1. Font" is selected, the screen proceeds to the deletion condition setting screen shown by FIG. 15C. The deletion condition setting screen allows the user to delete text employing a particular font as a deletion condition. For instance, if "1. Mincho font" is selected, explanatory notes and the like employing the Mincho font are deleted from the display of the projector 200. Incidentally, FIG. 16 is a diagram showing an example of a screen displayed when a background color is set, which is to be explained later. In this screen, the user may specify a background color using the color palette function of the Windows CE, for instance. The detail of the processing of this case will follow.

The detail of an example of a setting method, utilizing the remote controller 250, is explained in the above, but of course, it will not be limited to this. For example, a method for setting deletion conditions to delete text employing a particular font when a particular key is pressed can be designed. Also, the operation method of the projector 200 side is not limited to the remote controller 250, of course, and by having devices such as a keyboard or a mouse connected to the projector 200 and using them to operate a deletion process is possible. Moreover, the deletion condition specifying signal from the PC 100 side may be received by the deletion condition setting unit 207 via the LAN 50. In this case, too, it is unnecessary to include the deletion condition part 350 in the slide data 300.

(Third Embodiment)

Next, the third embodiment of the present invention is explained. In each of the above embodiments, designated data such as explanatory notes are made invisible by deleting the designated data. However, thinking in a reverse direction enables the display unit 102 of the PC 100 to display the designated data, without displaying the designated data to the screen 90. In the present embodiment, first of all, the first method is explained.

Figure 17:
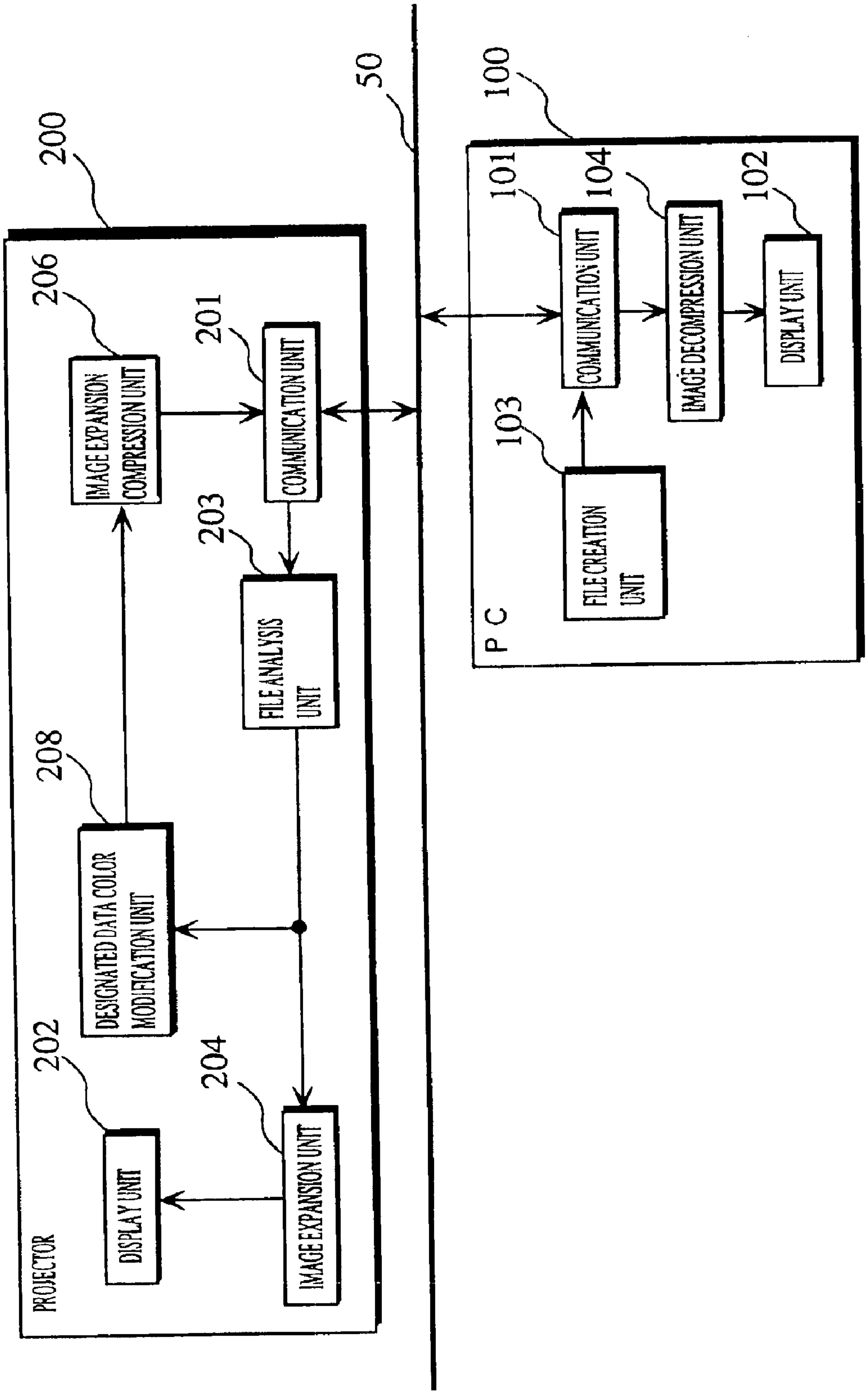
FIG. 17 is a functional block diagram showing a structure of a PC 100 and a projector 200 of a third embodiment.

FIG. 17 is a functional block diagram showing structures of the PC 100 and the projector 200 of the present embodiment. Structure of the PC 100 is the same as the structure shown in the first embodiment. Also the structure of the projector 200, too, is the same as the structure shown in the first embodiment except that it provides a designated data color modifying unit 208 instead of the designated data deletion unit 205. Therefore, parts that differ will be explained mainly.

The designated data color modifying unit 208 modifies the color of the designated data but does bot delete the data. In the present embodiment, a file is created, making the color of the designated data same as the background color when creating the slide data at the file creation unit 103 of the PC 100. Thus, at the time of the file creation, the designated data is already created to be invisible.

In the present embodiment, on the projector 200 side, image expansion unit 204 expands the slide data as it is into image data and makes the display unit 202 display the image. On the other hand, the designated data color modifying unit 208 modifies the color of the text employing a particular font and the like, visualizing the designated data. Then the image expansion compression unit 206 expands the modified slide data into image data, compresses it, and transmits it to the PC 100.

Figure 18:
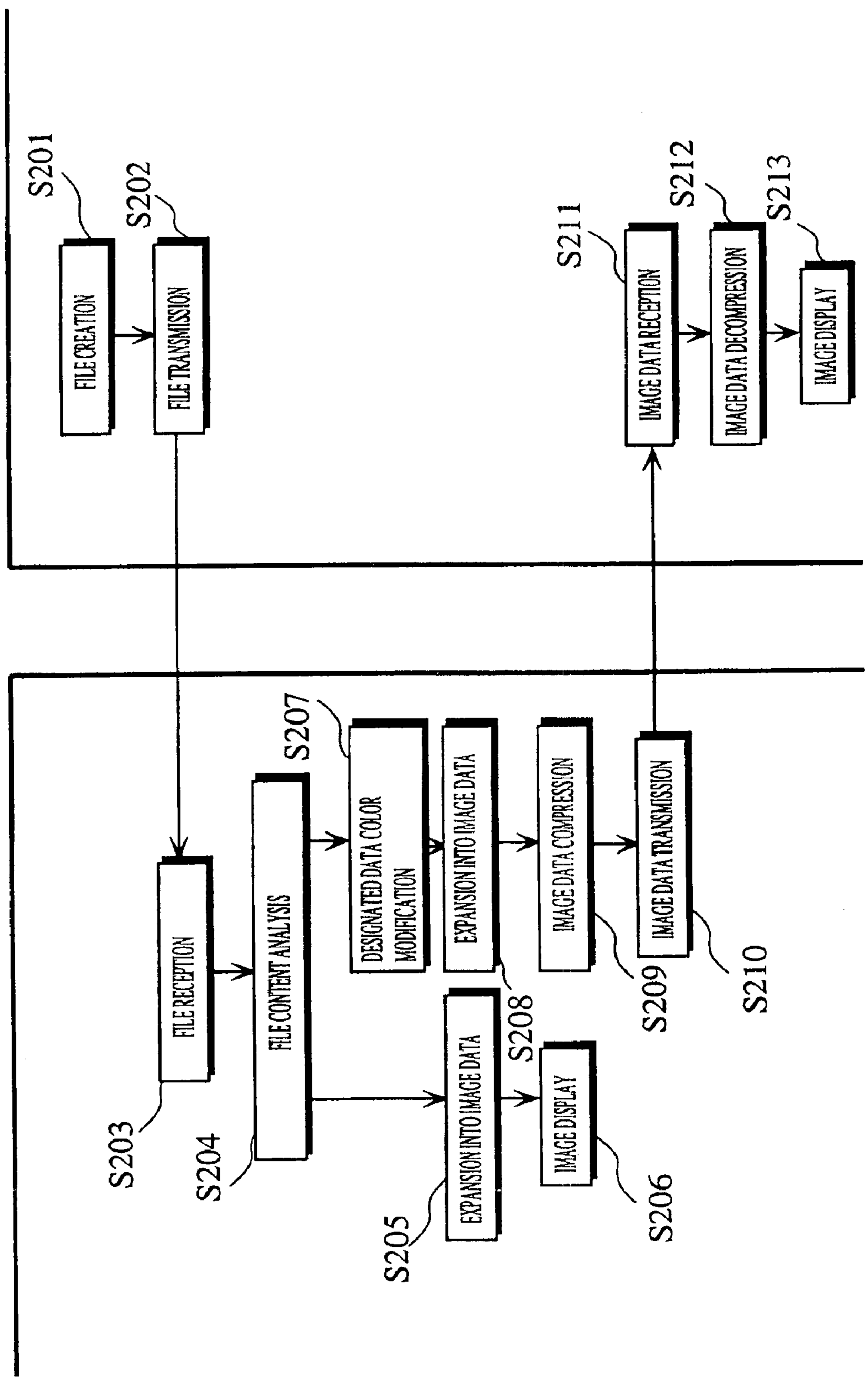
FIG. 18 is a flow chart showing processes executed by a PC 910 and a projector 920 of a third embodiment.
Figure 19:
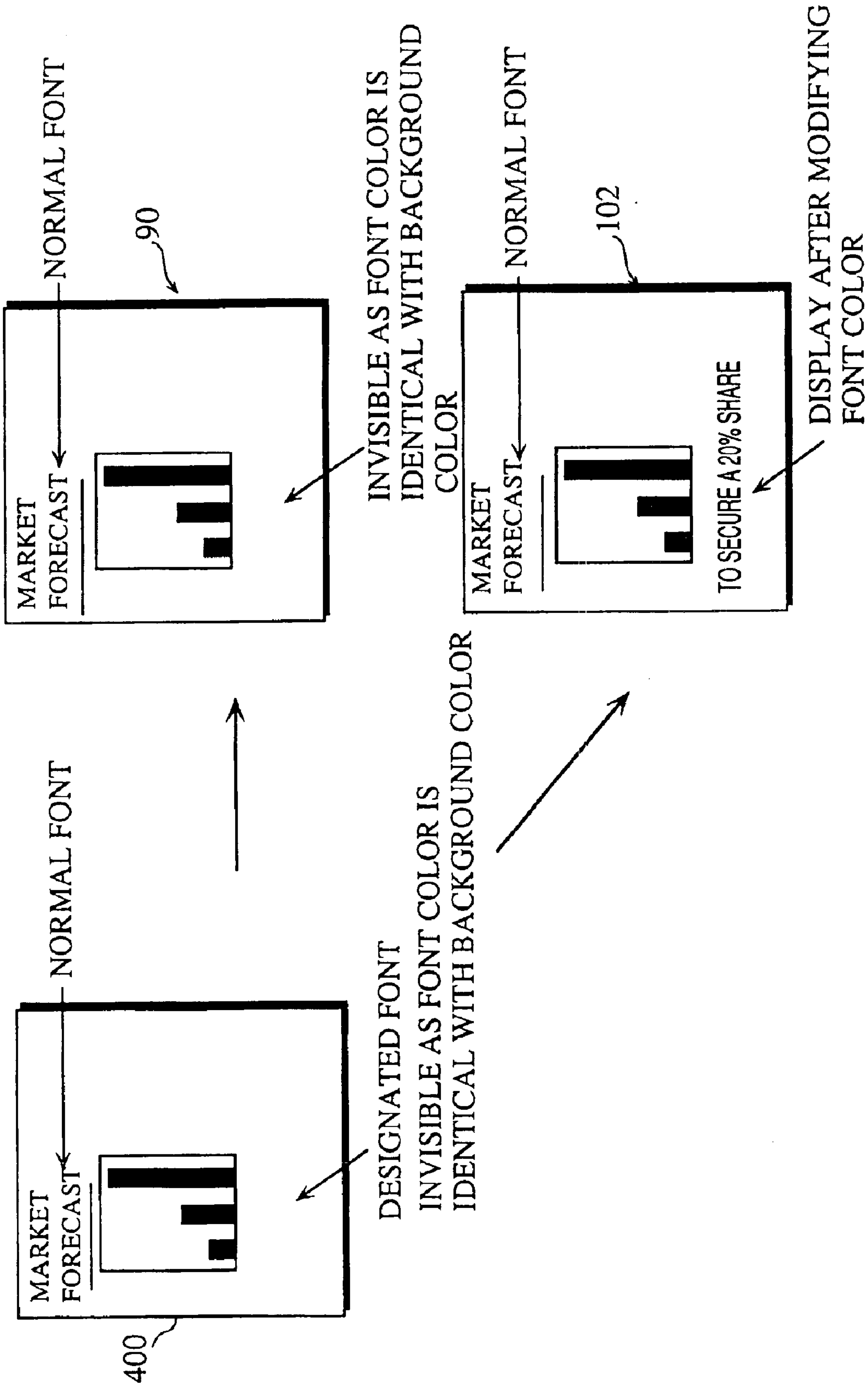
FIG. 19 is a diagram explaining how an image 400 which corresponds to slide data created by a file creation unit 103 is displayed by a screen 90 and a display unit 102 in a third embodiment.

PC 100 displays the received image data to the display unit 102, but the designated data is visualized and displayed to the display unit 102 as the color of the designated data is modified. The followings explain processing of the PC 100 and the projector 200 of the present embodiment by referring to FIG. 18 and FIG. 19. FIG. 18 is a flow chart showing processing of the PC 100 and the projector 200. FIG. 19 is a diagram for explaining how the image 400 which corresponds to the slide data created by the file creation unit 103 is displayed onto the screen 90 and the display unit 102.

In the present embodiment, after analysis of file contents by the projector 200 side (S204), the file is expanded into image data as it is (S205), and displayed by the display unit 202 (S206). By this, as shown in the bottom right of FIG. 19, the designated data is made invisible in the image projected to the screen 90.

On the other hand, the designated data color modifying unit 208 modifies the color of the designated data, for instance, the color of text employing a particular font (S207) and expands the data into image data (S208). The following process is the same as the one shown in the first embodiment, but this visualizes the designated data in the image displayed by the display unit 102 of the PC 100 side, as shown in the bottom right of FIG. 19.

As explained in the above, the method of the present embodiment may visualize the designated data in the display unit 102 of the PC 100 side while maintaining the designated data invisible in the image displayed by the projector 200 side. Incidentally, the method of the present embodiment, in comparison with the first embodiment, expands the received slide data as it is into image data, therefore, it has an advantage in being able to display the data by the display unit 202 of the projector 200 promptly. However, making the designated data invisible is allowed by creating slide data visualizing the designated data on the PC 100 side and modifying the color of the designated data to coordinate with the background color of the projector 200 side.

Also, even when employing the method of the present embodiment, as explained in the second embodiment, a condition setting unit may be provided on the PC 100 side or the projector 200 side. To be more specific, an inclusion of information specifying the text font of which color should be modified in case the condition setting unit is provided in PC 100, or a provision of a condition setting method in the projector 200 side, for example, a setting by using the remote controller 250 is possible.

(Fourth Embodiment)

Next, the fourth embodiment of the present invention is explained. The present embodiment, as in the third embodiment, offers to think in a reverse direction from the first embodiment and explains the second method which makes the display unit of the PC 100 display the designated data.

Figure 20:
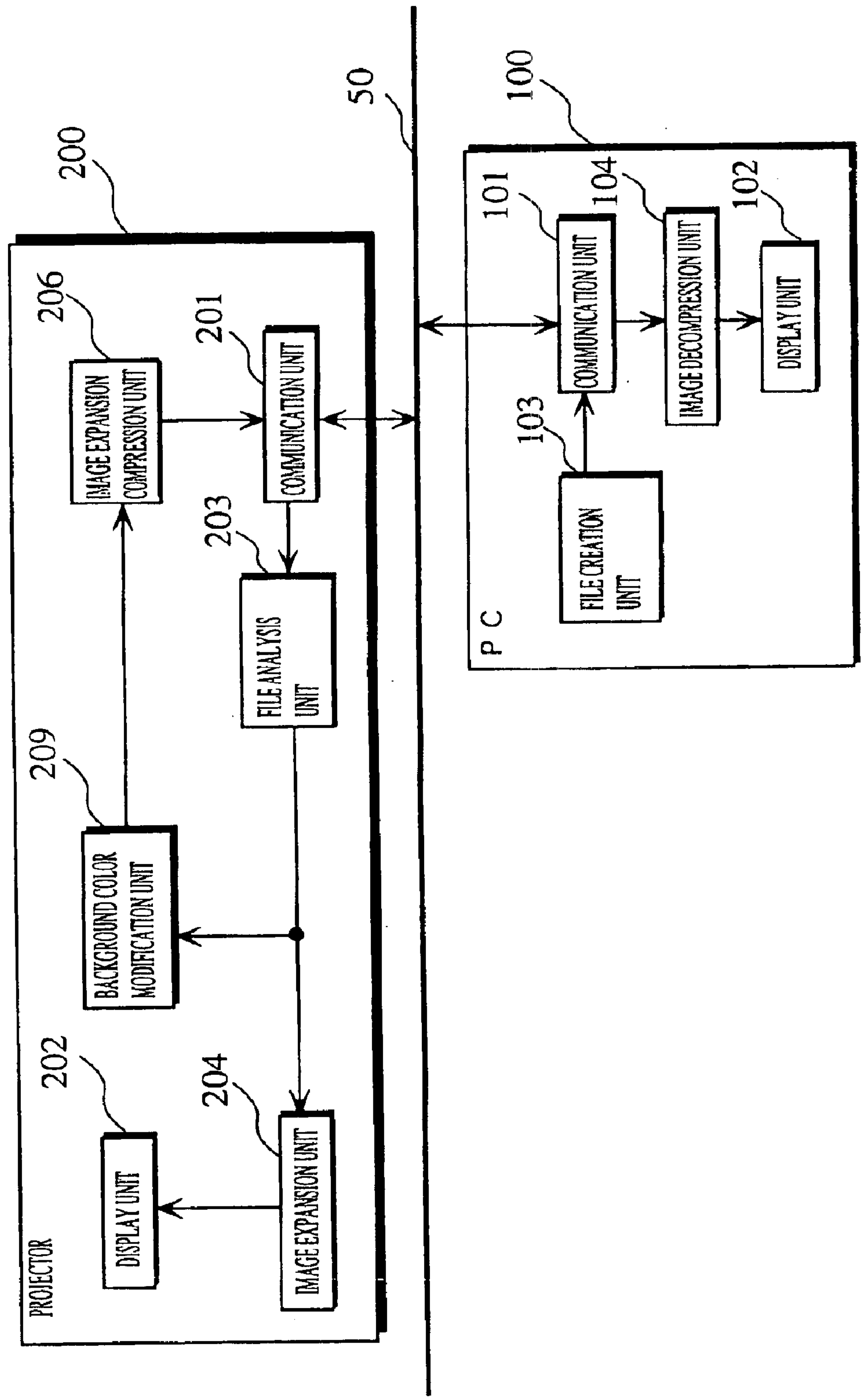
FIG. 20 is a functional block diagram showing a structure of a PC 100 and a projector 200 of a fourth embodiment.

FIG. 20 is a functional block diagram showing the structure of the PC 100 and the projector 200 of the present embodiment. The structure of the PC 100 is the same as the structure shown in the first embodiment. The structure of the projector 200, too, is the same as the structure shown in the third embodiment except that it provides the background color modifying unit 209 instead of the designated data color modifying unit 208. Therefore, parts that differ will be explained mainly.

The background color modifying unit 209 modifies the setting of the background part 330 in the slide data. Incidentally, in the present embodiment, when creating the slide data at the file creation unit 103 of the PC 100, the color of the designated data is created to coordinate with the background color. Thus, as in the third embodiment, the designated data is created to be invisible already at the time of the file creation.

Also in the present embodiment, the slide data is expanded as it is into image data and displayed by the display unit 202 of the projector 200 side. On the other hand, the background color modifying unit 209 visualizes the designated data by modifying the background color, and the image expansion compression unit 206 expands the data into image data, compresses the data, then transmits the data to the PC 100.

Figure 21:
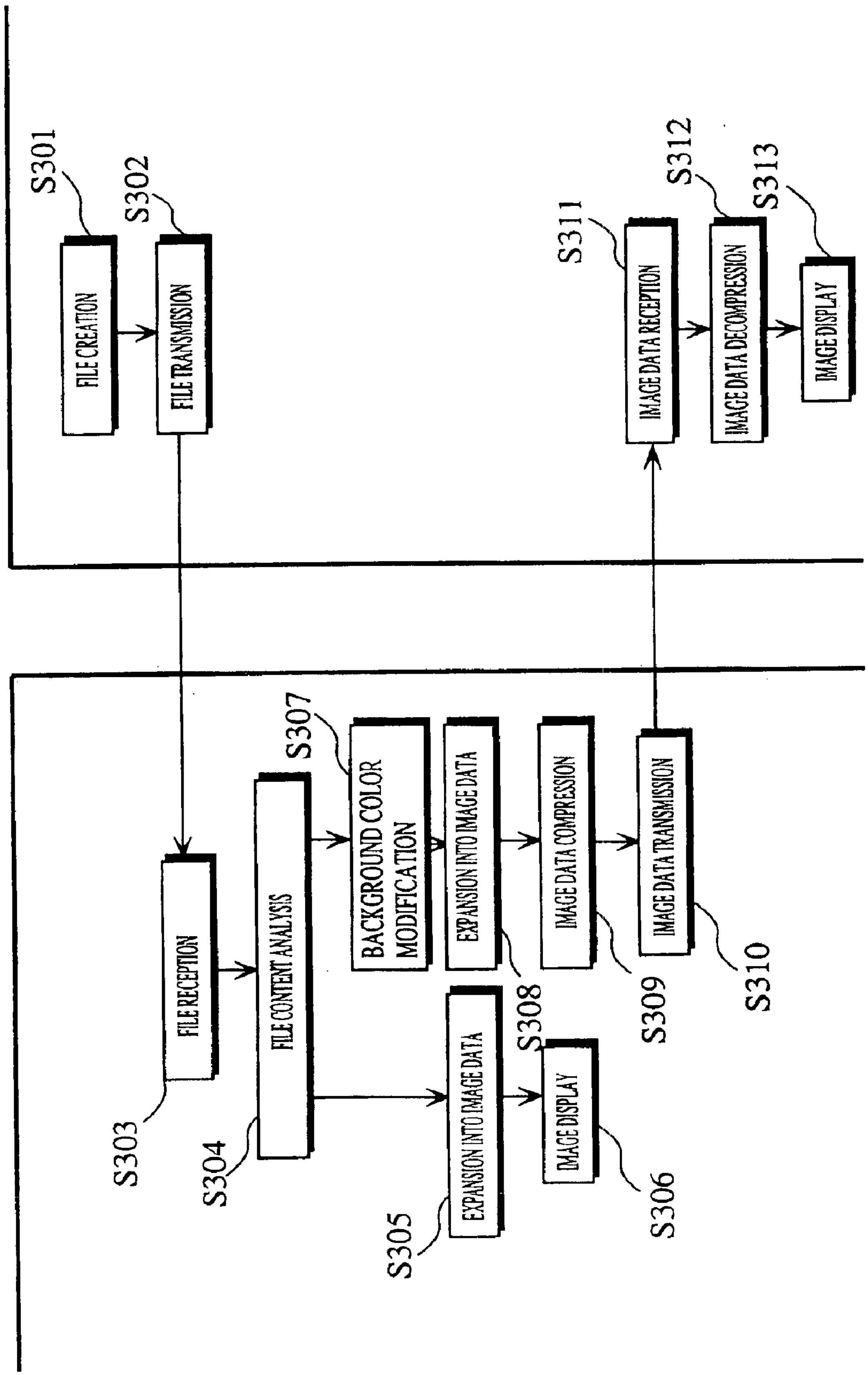
FIG. 21 is a flow chart showing processes executed by a PC 910 and a projector 920 of a fourth embodiment.
Figure 22:
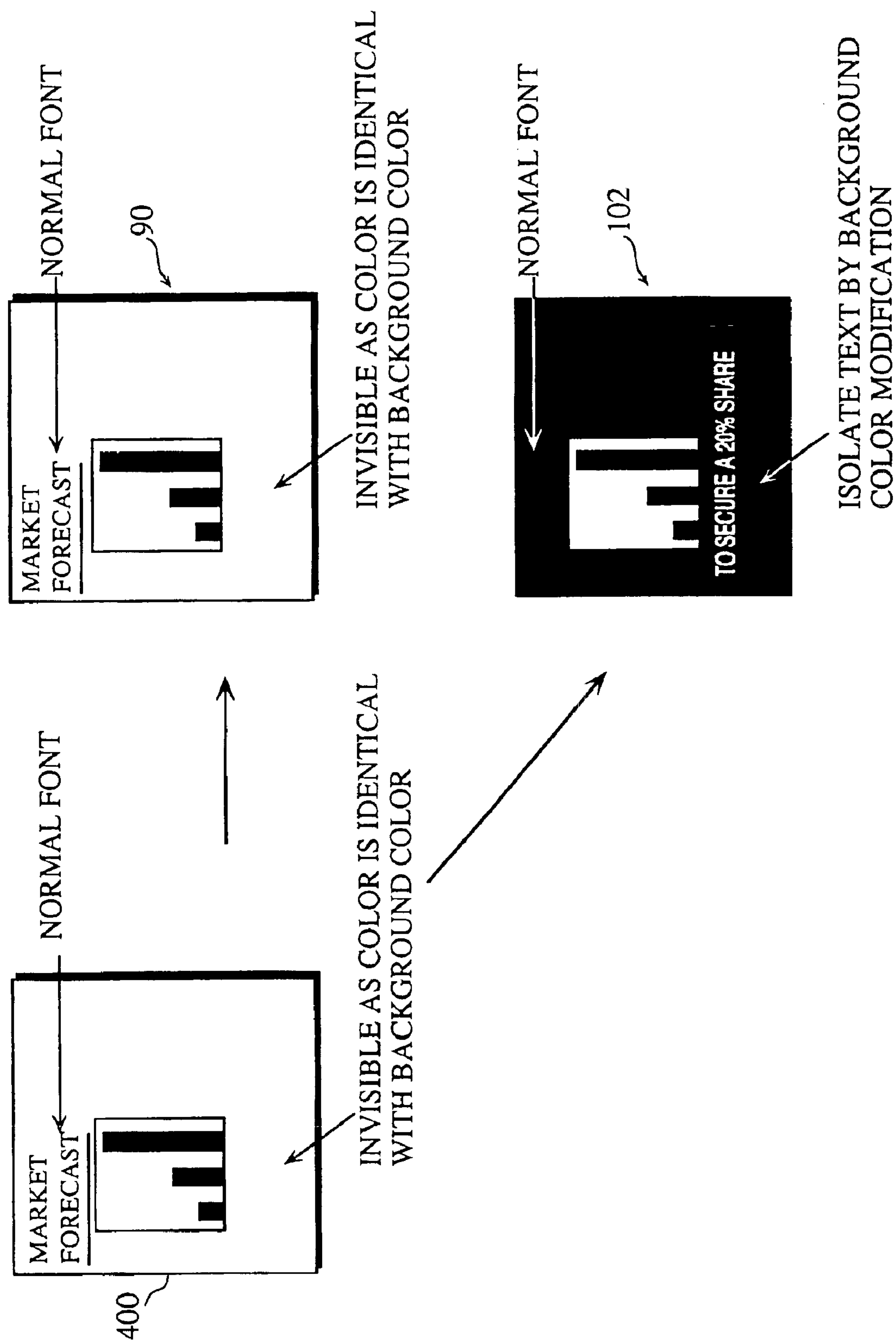
FIG. 22 is a diagram explaining how an image 400 which corresponds to slide data created by a file creation unit 103 is displayed by a screen 90 and a display unit 102 in a fourth embodiment.

The display unit of the PC 100 displays the received image data to the display unit 102, but at this time, the designated data is visualized and displayed as the background color is modified. The followings explain the processing of the PC 100 and the projector 200 of the present embodiment by referring to FIG. 21 and FIG. 22. FIG. 21 is a flow chart showing the processing of the PC 100 and the projector 200, and FIG. 22 is a diagram explaining how the image 400 which corresponds to the slide data created by the file creation unit 103 is displayed by the screen 90 and the display unit 102.

In the present embodiment, after having the file contents analyzed by the projector 200 (S304), the file is expanded as it is into image data (S305), and makes the display unit 202 display the image (S306). This enables the designated data to be projected in an invisible state to the screen 90 as shown in the top right of FIG. 22.

On the other hand, the background color modifying unit 209 modifies the background color (S307) and expands the data into image data (S308). The rest of the process is the same as shown in the third embodiment and this will display an image with the visualized designated data in the display unit 102 of the PC 100, as shown in the bottom right of FIG. 22.

As explained in the above, the method of the present embodiment may visualize the designated data in the display unit 102 of the PC 100 side while maintaining the designated data invisible in the image displayed by the projector 200. Incidentally, the method of the present embodiment, as in the third embodiment, expands the received slide data as it is into image data in the projector 200, therefore, it has an advantage in being able to display the data by the display unit 202 of the projector 200 promptly. Moreover, the method of the present embodiment modifies only the background color, therefore, for instance, there is no need to search for designated data employing a particular font or a color, thus accelerating the display process. Further, in the first place, it is unnecessary to designate conditions for making designated data invisible, for example, there is no need to specify a particular font, therefore the method has an advantage in being able to avoid restrictions such as an unavailability to use a particular font for the slide data.

Incidentally, in the present embodiment, creating the slide data which is the visualized designated data, on the PC 100 side and modifying the background color on the projector 200 side to coordinate with the color of the designated data in order to make the designated data invisible is possible.

In the above embodiment, a new background color is predetermined, but setting of the new background color after modification is possible by using the condition setting unit explained in the second embodiment. In this case, it is capable of displaying a screen such as the one shown in FIG. 16 and designate the background color after modification by using means such as the remote controller 250.

There are some other variations, for instance, designating the background color before modification and modifying the background color to other colors from the designated color may be possible. Memorizing combinations of colors of before and after modification which enable easy text recognition may also be possible. In this case, if a background color before modification (same as the color of the text) is black, for example, the background color modifying unit 209 can automatically modify the background color to white, based on the memorized combinations. Of course, designation of background colors both before and after the modification is also possible and in case when the actual background color before modification is different from the designated background color, it can be set not to carry out the modification of the background color.

Again, it is needless to say that the designated method is not limited to the method utilizing the remote controller 250. Means like a keyboard, a mouse, or a switch may be used. Transmission of the slide data including background color related data designated in the PC 100 side to the projector 200 is also possible.

(Fifth Embodiment)

Next, the fifth embodiment of the present invention is explained. In the present embodiment, a process of making the display unit 202 of the projector 200 display by switching between the image with invisible designated data and the image with visible designated data is explained.

The examples of advantage in switching between (a) the image of the invisible designated data (to be referred as "image made invisible") and (b) the image containing visible designated data (to be referred as "visible image") are explained below. At the time of performing a presentation, there is a time when a presenter would like particular information (an answer to a question, for example) to be maintained invisible until predetermined timing and display the information visually afterward. In this case, in terms of data processing time, it is disadvantageous to carry out an image data expansion once again, therefore the present embodiment enables a display of visible image which is compressed and transmitted to the PC 100 side in each of the above embodiments, switching with the image made invisible.

Figure 23:
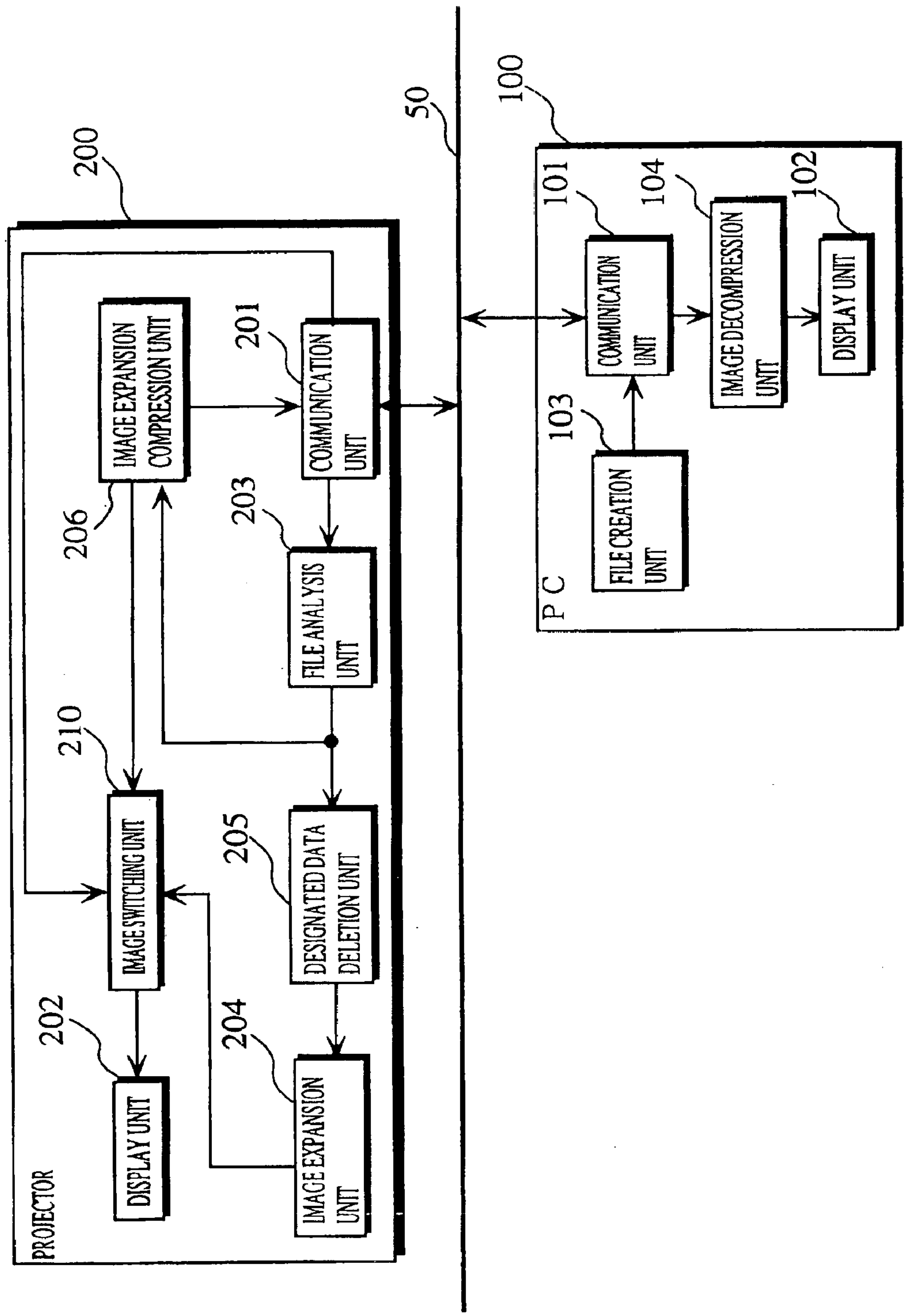
FIG. 23 is a functional block diagram showing a structure of a PC 100 and a projector 200 of a fifth embodiment.

FIG. 23 is a functional block diagram showing an example of the structure of the PC 100 and the projector 200 of the present embodiment. Explanation of the PC 100 is omitted as its structure is exactly the same as the equivalent shown in the above embodiments. As shown by the figure, the projector 200 of the present embodiment is equipped with an image switching unit 210.

In the image switching unit 210, (a) image data which is data made invisible and expanded at the image expansion unit 204, (b) image data of visible image (image data before compression process) which is expanded at the image expansion compression unit 206, and (c) switching instruction signals inputted from the outside via the communication unit 201, are inputted.

The image switching unit 210 switches whether to make the display unit 202 display the image made invisible or the visible image, according to the switching instruction signals. As for the switching instruction signals, transmission of signals which indicates a click of a mouse or keyboard operation provided in the PC 100 may be utilized or input switching instruction signals may be input by providing a separate switch and the like to the projector 200, not by way of the communication unit 201.

This enables the display of the image made invisible first, and switching of the image to the visible image afterward as the presentation proceeds. Incidentally, the functions of the image switching unit 210, for example, can be realized by booting two viewers at the same time and switching between the two viewers depending on which image should be displayed.

The above embodiment switched image between the image made invisible deleted of the designated data and the visible image, but needless to say, switching between (a) the image made invisible which contains designated data with a modified color and the visible image, and (b) the image made invisible whose background color being modified and the visible image, may be arranged.

As explained in the above in detail, by utilizing the presentation system of the present invention, a smooth presentation can be realized. Incidentally, in the above embodiment, the case where the slide data being transmitted from the PC 100 to the projector 200, processing the data (making the data invisible or visible) on the projector 200 side, and returning the data back to the PC 100 side was explained. However, the processing of the slide data, either to make the data invisible or visible, can also be executed by the PC 100 side. In this case, especially when viewer software is installed also on the PC 100 side, the need to transmit the compressed image data from the projector 200 to the PC 100 can be eliminated.

The process for making the designated data invisible or visible may be realized by the software, therefore programs which make a processor equipped by the PC 100 or the projector 200 carry out these processes can be stored in various recording media such as a diskette, a CD-ROM, a DVD-ROM, and a memory card, and by installing the software from the recording media to the PC 100 or the projector 200, the presentation system of the present invention is realized. Also, these programs may be transmitted via a network. In case of the display device such as the projector 200, at the present time, the best area to store the program is considered to be the ROM from the production cost point of view.

Various embodiments of the present invention have been explained in the above, but it is needless to say that the contents of the present invention are not limited to the examples shown in the above embodiments. The followings explain constituent features of the present invention, including its corresponding relationship with each of the above embodiment.

(1) A Terminal and a Display Device

In the above embodiment, a PC 100 is used as a terminal for transmitting the slide data and the projector 200 as a display device for expanding and displaying the transmitted slide data, but as for a terminal, apart from a conventional PC, various devices may be used which are equipped with display means and processors and able to execute the presentation software. As for a display device, apart from a projector, various display devices such as a CRT, a LCD, a plasma display panel (PDP), and so forth may be used.

(2) Slide Data

Slide data is data created and edited by presentation software. It is data which indicates a slide displayed for a presentation. In the above embodiments, the data is composed of a text part which includes text data and the like, a font part which includes information indicating the text font used, a background part which includes information regarding background, and other parts, and they are subject to a search executed by a data modifying unit which is explained later. It is possible to include information regarding methods and/or conditions of data deletion data depending on the contents of the process for making data invisible or visible compression method of attached image and other conditions. The file which includes slide data is the presentation file.

(3) A First Display Unit

A first display unit is the display unit on the display device side which corresponds to the display unit 202 of the above embodiments. In case the projector 200 which uses a LCD light valve as a display device, mainly a luminous source, an optical or an LCD light valve, a circuit for displaying image to the LCD light valve, and the like correspond to the first display unit.

(4) A Data Obtaining Unit

A data obtaining unit corresponds with the communication unit 201 of the projector 200 side in the above embodiments. To be more specific, a network interface card and the like which correspond to various LAN may be used, but it is also possible to set a reading device of a recording medium such as a disc as the data obtaining unit and obtain a presentation file from the recording medium.

(5) A Data Modifying Unit

A data modifying unit is corresponded by the designated data deletion unit 205, the designated data color modifying unit 208, and the background color modifying unit 209 of the above embodiments. A detailed process is realized by an operation of a program which can be operated by the processor installed on the display device side. By searching for slide data contents and (a) deleting parts which satisfy specified conditions, (b) modifying parameters which indicate a color, and (c) modifying parameters which indicate a background color, the data modifying unit makes one or more parts of the slide image invisible. Methods for making the data invisible may be deletion of the textbox, deletion of the text included in the textbox, deletion of text and the like placed by the presentation software, and others like a modification of the background color to make it the same with the text color, and a modification of the text color to make it the same with the background color. Incidentally, in the slide data before a modification, a modification which makes invisible text visible may be executed. In this case, it is possible to modify the background color to differentiate from the text color, and modify the text color to differentiate with the background color.

The textbox mentioned here is not a function unique to the presentation software. It is a general function for use by an OS such as Windows and capable of having text embedded in an arbitrary location of the slide. However, whether being called a textbox or not, as long as the similar function is capable of searching a particular data from the slide data and modifying the data to make it invisible or visible, the data modifying unit is capable of making the data invisible or visible.

(6) A First Display Image Setting Unit

A first display image setting unit is a part which sets an image to be actually displayed in the first display unit, and corresponded by the image expansion unit 204 of the projector 200 side in the above embodiments. To be more specific, it expands slide data into image data employing such as a bitmap format, and sends the data to be displayed to the first display unit.

(7) A Second Display Unit

A second display unit is the display unit of the terminal side and corresponded by the display unit 102 which is connected to the PC 100, in case the PC 100 is used as a terminal as in the above embodiments.

(8) A Second Display Image Setting Unit

A second display image setting unit is a part which sets an image to be actually displayed in the second display unit, and included in the image decompression unit 104 in the above embodiments.

(9) A Transmission Unit and a Reception Unit

In the above embodiments, a transmission unit and a reception unit on the terminal side are corresponded by the communication unit 101, and the equivalents on the display device side by the communication unit 201, more specifically, corresponded by the network interface part.

(10) An Editing Unit

An editing unit is realized by functions of a presentation software, and edits contents of the slide data based on input from an input device such as a mouse or a keyboard. It is corresponded by the file creation unit 103 in the above embodiments.

(11) A Modification Condition Setting Unit

In the above embodiments, a modification condition setting unit is corresponded by the deletion condition setting unit 207 of the projector 200 side and the deletion condition setting unit 105 of the PC 100 side. To be more specific, the modification condition setting unit is capable of providing (a) a part which displays a screen for condition setting as shown in FIG. 15A, FIG. 15B, and FIG. 15C by using the display unit, and (b) an input device such as the remote controller 250. The contents of setting may include (a) the method of modification to be executed by the data modifying unit, and/or (b) the conditions to be satisfied by parts for modification of the parts to take place. For setting the method of modifications, for instance, various settings may be executed such as a setting of text employing a particular font to be invisible or visible, a setting to modify the background color, a setting of text employing a particular color to be invisible, and others. Moreover, as for the conditions to be satisfied by parts for a modification of the parts to take place, a setting of a particular font and color may be possible. For example, it is possible to set the Mincho text invisible.

(12) An Image Expansion Unit

In the above embodiments, an image expansion unit corresponds to a part of the image expansion compression unit 206 and expands slide data into a format to be displayed at the terminal side, such as a bitmap format. To be more specific, it is possible to use a function of software called a file viewer.

(13) An Image Data Compression Unit

In the above embodiments, an image data compression unit corresponds to a part of the image expansion compression unit 206 and compresses the expanded image data. This process can be executed by the software, nevertheless, it is usually preferred to use a specialized hardware.

(14) An Image Data Decompression Unit

In the above embodiments, an image data decompression unit corresponds to the image decompression unit 104. It decompresses the compressed image data and transmits the data to the second display image setting unit 102 of the PC 100 side.

(15) A deletion Unit, a Color Modifying Unit, and a Background Color Modifying Unit In the above embodiments, a deletion unit corresponds to the designated data deletion unit 205, a color modifying unit to the designated data color modifying unit 208, and the background color modifying unit to the background color modifying unit 209. Incidentally, a plurality of these units may be provided, not just one.

(16) A Switching Unit

In the above embodiments, a switching unit is corresponded by the image switching unit 210. To be more specific, for instance, a plurality of viewers may be booted and switched between the viewers.

(17) A File Obtaining Step

In the above embodiments, a file obtaining step is corresponded, for instance, by the step S103 (file reception), nevertheless, a file may be obtained by a recording medium.

(18) A Data Modifying Step

In the above embodiments, for instance, a data modifying step is corresponded by a process of the step S105 (a designated data deletion), the step S207 (a designated data color modification) and the step S307 (a background color modification). To be more specific, as an example of deletion of parts included in the slide data, deletion of text data satisfying specified conditions, and as an example of a modification of parameters, a modification of parameters indicating the color of text, parameters indicating the background color, and others may be mentioned.

(19) Incidentally, in the above embodiments, the case where a cable LAN 50 is used as a network is explained, but it is not limited to this and a wireless LAN may be used instead. The presentation system of the present invention exchanges data between the terminal and the display device not in a format expanded into image data but in a slide data format, therefore even when a wireless LAN which has an inferior data transmission speed is used, it may be supported well. Moreover, the present embodiment is not limited to the use of the network and an embodiment which connects a terminal with a projector one against another is also applicable.

(20) In the above embodiment, the image expansion unit 204 and the image expansion compression unit 206 are mentioned as separate blocks, but since any expansion processes into image data are realized by using software so-called viewer software, single software can be shared thus there is no need to have more than one software.

(21) Deletion of the designated data and modification of a color of text, the background and the like as a method for making the data invisible, and modification of a text color and a background color as a method for visualizing data may be combined together and executed. For instance, designated data employing a particular font may be deleted while data employing another particular font or a color may be made invisible by modifying the color, moreover, by changing the colors of both the designated data and the background, making of data invisible can be realized. Additionally, as for the deletion of the designated data, the data do not need to be deleted physically and may be arranged not to be displayed, for example, by inserting a symbol to the data which makes viewer software regard the data as a comment line, so that the data will not be displayed.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A presentation system comprising a display device and a terminal, the display device includes a data obtaining unit
for obtaining a file containing slide data which indicates a first slide image;

a data modifying unit
for modifying the slide data to make one or more parts of the first slide image invisible;

a first display unit; and a first display image setting unit
for having the first display unit display a second slide image based on the modified slide data, the second slide image being a slide image in which one or more parts of the first slide image are invisible; and the terminal includes a second display unit; and a second display image setting unit
for having the second display unit display the first slide image.

2. The presentation system of claim 1, wherein the terminal further includes a transmission unit for transmitting the file containing the slide data to the display device, wherein the data obtaining unit obtains the file by receiving the file transmitted by the transmission unit.

3. The presentation system of claim 2, wherein the terminal further includes an editing unit for editing the slide data in accordance with an input from outside.

4. The presentation system of claim 1, wherein the part which is made invisible by the data modifying unit is a part of text put in the first slide image by utilizing functions of presentation software.

5. The presentation system of claim 1, wherein the part which is made invisible by the data modifying unit is a part of text put in a textbox which is embedded in the first slide image.

6. The presentation system of claim 1, wherein the display device further includes a modification condition setting unit for receiving settings regarding (a) a method of modification to be executed by the data modifying unit, and/or (b) conditions to be satisfied by parts of data to be modified.

7. A presentation system comprising a display device and a terminal, the display device includes a data obtaining unit for obtaining the file containing slide data which indicates the first slide image, the first slide image including one or more invisible parts;

a first display unit;

a first display image setting unit for making the first display unit display the first slide image, based on the slide data;

a data modifying unit for modifying the slide data to make the invisible parts of the first slide image visible;

an image expansion unit for generating image data of the second slide image from slide data modified by the data modifying unit;

an image data compression unit for compressing the image data of the second slide image; and a transmission unit for transmitting the image data compressed by the image data compression unit to the terminal; and the terminal includes a reception unit for receiving the image data transmitted by the transmission unit;

an image data decompression unit for decompressing the image data received by the reception unit;

a second display unit; and a second display image setting unit for making the second display unit display the second slide image, based on the decompressed image data.

8. The presentation system of claim 7, wherein the display device further includes a modification condition setting unit for receiving settings regarding (a) a method of modification to be executed by the data modifying unit, and/or (b) conditions to be satisfied by parts of data to be modified.

9. A display device comprising:

a data obtaining unit for obtaining a file containing a first slide data which indicates a first slide image;

a data modifying unit for executing at least one of the following processes, (a) creates the second slide data which indicates the second slide image by modifying the first slide data, the second slide image being an image which has one or more parts of the first slide image invisible, (b) creates a second slide data which indicates a second slide image by modifying the first slide data, the second slide image being an image of one or more invisible parts of the first image modified to be visible;

a display unit; and a display image setting unit for making the display unit display a slide image based on the first slide data or the second slide data, wherein the displayed image is (a) the second slide image if the second slide image is a slide image which has one or more parts of the first slide image part invisible, and (b) the first slide image if the second slide image is an image of one or more invisible parts modified to be visible.

10. The display device of claim 9, wherein the data obtaining unit includes a reception unit for receiving the file.

11. The display device of claim 9 further comprising:

an image expansion unit for generating image data of a first slide image or a second slide image from a first slide data or a second slide data, wherein the slide image for which the image data is generated is the first slide image if the second slide image is an image of one or more parts of the first slide image made invisible, and is the second slide image if the second image is an image of one or more invisible parts of the first image modified to be visible; an image data compression unit for compressing the image data which is generated by the image expansion unit; and a transmission unit for transmitting the compressed image data.

12. The display device of claim 9, wherein the part which is made invisible or visible by the data modifying unit is a part of text put in a slide image by utilizing functions of presentation software.

13. The display device of claim 9, wherein the part which is made invisible or visible by the data modifying unit is a part of text put in a textbox which is embedded in the slide image.

14. The display device of claim 9, wherein the data modifying unit includes a deletion unit for deleting a part which corresponds to an invisible part in the second slide image from the first slide data.

15. The display device of claim 9, wherein the data modifying unit includes a color modifying unit for modifying the color setting of a part which corresponds to an invisible or a visible part in the second slide image in contrast to the first slide data.

16. The display device of claim 9, wherein the data modifying unit includes a background color modification unit p2 for modifying the background color setting in contrast to the first slide data.

17. The display device of claim 9 includes a modification condition setting unit for receiving settings regarding (a) a method of modification to be executed by the data modifying unit, and/or (b) conditions to be satisfied by parts for a modification of the parts to take place.

18. The display device of claim 9, wherein the display control unit includes a switching unit for switching whether to make the display unit display the first or the second slide image.

19. A program which is operable by a processor provided in a display device with a display unit includes a file obtaining step for obtaining a file including a first slide data which indicates a first slide image;

a data modifying step for executing at least one of the following processes, (a) creates a second slide data which indicates the second slide image by modifying the first slide data, wherein the second slide image is an image which has one or more parts of the first slide image invisible (b) creates a second slide data which indicates a second slide image by modifying the first slide data, wherein the second image is an image of the first slide image which has the invisible parts modified to be visible;

and a display image setting step for making the display unit display a slide image based on the first slide data or the second slide data, wherein the displayed image is (a) the second slide image if the second slide image is a slide image which has one or more parts of the first slide image part invisible, and (b) the first slide image if the second slide image is an image of one or more invisible parts modified to be visible.

20. The program of claim 19, wherein the data modifying step modifies the contents of the first slide data into the second slide data by deleting one or more parts contained in the first slide data.

21. The program of claim 19, wherein the data modifying step modifies the contents of the first slide data into the second slide data by modifying parameters set in the first slide data.

* * * * *